(12) United States Patent
Mergener et al.

(10) Patent No.: US 9,197,146 B2
(45) Date of Patent: Nov. 24, 2015

(54) BRUSHLESS DIRECT-CURRENT MOTOR AND CONTROL FOR POWER TOOL

(71) Applicant: Milwaukee Electric Tool Corporation, Brookfield, WI (US)

(72) Inventors: Matthew J. Mergener, Germantown, WI (US); Matthew P. Wycklendt, Delafield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 236 days.

(21) Appl. No.: 13/832,360

(22) Filed: Mar. 15, 2013

(65) Prior Publication Data

US 2014/0028226 A1 Jan. 30, 2014

Related U.S. Application Data

(60) Provisional application No. 61/675,919, filed on Jul. 26, 2012.

(51) Int. Cl.
| | |
|---|---|
| *B25B 13/46* | (2006.01) |
| *H02P 6/14* | (2006.01) |
| *H02P 29/02* | (2006.01) |
| *B25F 5/00* | (2006.01) |

(52) U.S. Cl.
CPC ... *H02P 6/14* (2013.01); *B25F 5/00* (2013.01); *H02P 6/142* (2013.01); *H02P 29/021* (2013.01)

(58) Field of Classification Search
CPC ............ H02P 6/08; H02P 6/16; H02P 6/14; H02P 7/06; H02P 7/29; H02P 8/14; H02K 7/14; H01R 13/623; H01R 13/6641; H03K 17/166

USPC ............ 318/400.09, 400.28, 400.14, 400.06, 318/400.38; 363/138
See application file for complete search history.

(56) References Cited

U.S. PATENT DOCUMENTS

| | | | | |
|---|---|---|---|---|
| 4,047,083 | A | * | 9/1977 | Plunkett ........................ 318/807 |
| 4,493,622 | A | | 1/1985 | Miller |
| 4,903,188 | A | | 2/1990 | Madhavan et al. |
| 5,148,358 | A | | 9/1992 | Estes, Jr. |
| 5,237,540 | A | * | 8/1993 | Malone ........................ 367/81 |
| 5,375,098 | A | * | 12/1994 | Malone et al. .................. 367/83 |

(Continued)

FOREIGN PATENT DOCUMENTS

| | | |
|---|---|---|
| EP | 1729406 | 12/2006 |
| JP | 2001169413 | 6/2001 |

(Continued)

*Primary Examiner* — Rita Leykin
(74) *Attorney, Agent, or Firm* — Michael Best & Friedrich LLP

(57) ABSTRACT

Brushless direct-current ("BLDC") motor and control for a power tool. A BLDC motor of a power tool is controlled in either a pulse-width modulation ("PWM") commutation mode or a centerline commutation mode. When the motor is rotating slowly, the motor is operated using PWM commutation. When the motor is rotating at a speed greater than a threshold speed value, the operation of the motor is transitioned to the centerline commutation mode. When operating in the centerline commutation mode, the high-side field-effect transistors ("FETs") and low-side FETs can each be used for motor speed control. By switching between speed control using the high-side FETs and speed control using the low-side FETs, the heat generated by freewheeling currents can be approximately evenly distributed among the high-side and low-side FETs.

24 Claims, 23 Drawing Sheets

(56) References Cited

U.S. PATENT DOCUMENTS

| | | | |
|---|---|---|---|
| 5,592,058 A | | 1/1997 | Archer et al. |
| 5,627,441 A | * | 5/1997 | Sakurai et al. ............... 318/599 |
| 5,742,139 A | | 4/1998 | Kolomeitsev |
| 5,780,986 A | | 7/1998 | Shelton et al. |
| 5,869,944 A | * | 2/1999 | Tanina ........................ 318/599 |
| 5,869,946 A | | 2/1999 | Carobolante |
| 5,880,574 A | | 3/1999 | Otsuka et al. |
| 5,933,342 A | | 8/1999 | Callanan |
| 5,955,851 A | | 9/1999 | Solie et al. |
| 6,002,226 A | * | 12/1999 | Collier-Hallman et al. ...................... 318/400.23 |
| 6,008,615 A | | 12/1999 | Sugden |
| 6,046,561 A | | 4/2000 | Zup et al. |
| 6,091,216 A | | 7/2000 | Takahashi et al. |
| 6,137,203 A | * | 10/2000 | Jermakian et al. ........... 310/191 |
| 6,677,724 B1 | * | 1/2004 | Kim et al. .................... 318/700 |
| 6,737,820 B2 | | 5/2004 | Witzig |
| 6,869,944 B2 | * | 3/2005 | Pamukcu et al. ............. 514/184 |
| 6,870,337 B2 | | 3/2005 | Peterson |
| 6,879,129 B2 | * | 4/2005 | Tazawa et al. ............... 318/727 |
| 6,891,343 B2 | | 5/2005 | Petersen |
| 6,919,700 B2 | | 7/2005 | Maslov et al. |
| 6,940,242 B1 | | 9/2005 | Maslov et al. |
| 6,956,343 B2 | | 10/2005 | Berroth et al. |
| 7,026,773 B2 | | 4/2006 | Petersen |
| 7,235,941 B2 | | 6/2007 | Park et al. |
| 7,248,005 B2 | | 7/2007 | Makaran |
| 7,288,911 B2 | | 10/2007 | MacKay |
| 7,298,106 B2 | | 11/2007 | Yamamoto et al. |
| 7,477,034 B2 | | 1/2009 | MacKay |
| 7,592,761 B2 | | 9/2009 | MacKay |
| 7,701,738 B2 | | 4/2010 | Pruessmeier et al. |
| 7,764,032 B2 | | 7/2010 | Crabill et al. |
| 7,786,687 B2 | * | 8/2010 | Namuduri et al. ....... 318/400.09 |
| 8,018,740 B2 | * | 9/2011 | Sun et al. ...................... 363/16 |
| 8,102,192 B2 | | 1/2012 | Mourrier et al. |
| 8,198,839 B2 | * | 6/2012 | Katou et al. ............. 318/400.01 |
| 8,319,456 B2 | * | 11/2012 | Ramu ...................... 318/254.1 |
| 8,378,600 B2 | * | 2/2013 | Katou et al. ............. 318/400.01 |
| 8,430,347 B2 | * | 4/2013 | Jensen et al. .................... 241/36 |
| 2003/0089511 A1 | * | 5/2003 | Tsuneda et al. ............... 173/217 |
| 2007/0069677 A1 | | 3/2007 | MacKay |
| 2009/0027096 A1 | | 1/2009 | Mourrier et al. |
| 2010/0259206 A1 | | 10/2010 | Joachimsmeyer |
| 2011/0084639 A1 | * | 4/2011 | Brown .................... 318/400.35 |
| 2011/0163706 A1 | | 7/2011 | Miura et al. |

FOREIGN PATENT DOCUMENTS

| | | |
|---|---|---|
| WO | 2010047455 | 4/2010 |
| WO | 2011054074 | 5/2011 |

* cited by examiner

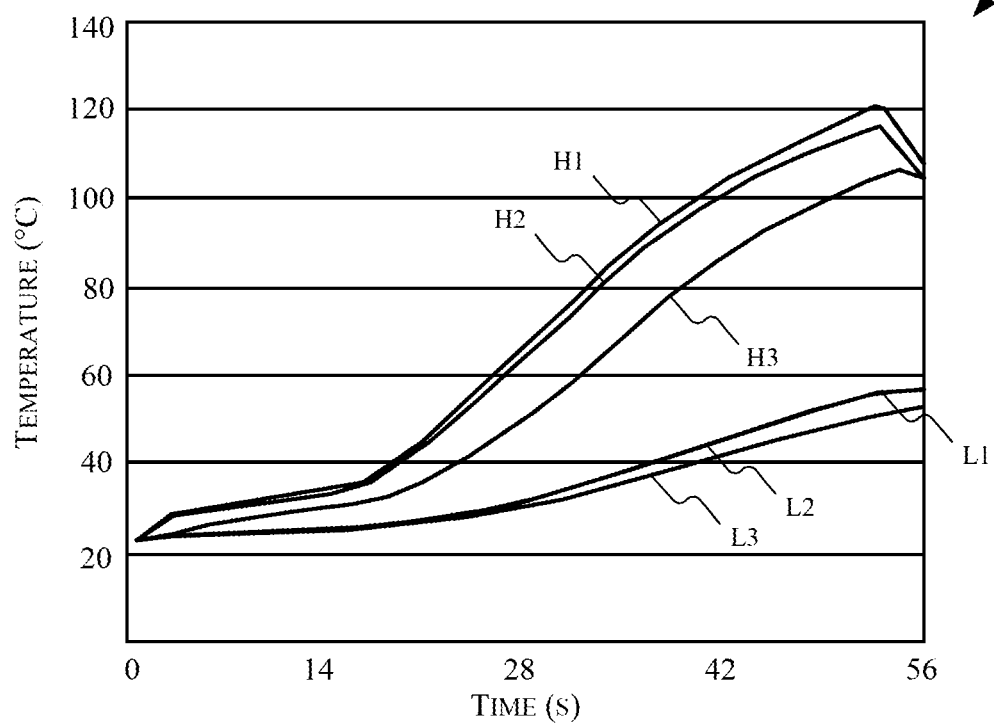
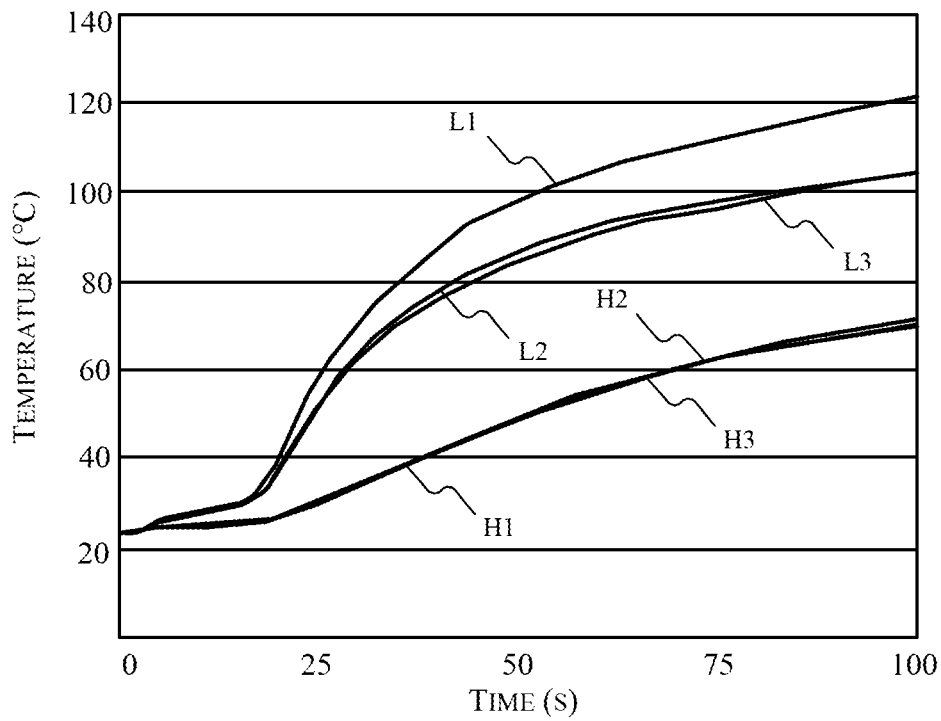

BRUSHLESS DIRECT-CURRENT MOTOR AND CONTROL FOR POWER TOOL

RELATED APPLICATIONS

This application claims the benefit of U.S. Provisional Patent Application No. 61/675,919, filed Jul. 26, 2012, the entire content of which is hereby incorporated by reference.

BACKGROUND

This invention relates to power tools including direct current motors.

SUMMARY

Power tools, such as hand-held power tools, are typically powered by a motor that includes brushes for achieving motor commutation. The use of brushes for commutation in a motor, although effective, has a variety of drawbacks. For example, the brushes can eventually wear down and adversely affect the operation of a power tool. Another type of motor, brushless-type motors, have not been widely used in power tools as a result of, among other things, design considerations necessary for motor control. However, there are a number of advantages to implementing a brushless motor in a power tool if the necessary controls can be implemented to achieve a desired level of performance. The advantages include the ability to use electronic commutation, improved life of the motor, etc. The invention disclosed herein provides a variety of control features and optimizations for brushless motors, including the implementation of multiple commutation schemes (e.g., PWM commutation and centerline commutation) and distributed heat generation, among others.

In one embodiment, the invention provides a power tool that includes a brushless direct current ("BLDC") motor and a controller. The controller is configured to drive the motor using pulse-width modulation ("PWM") commutation, determine a speed of the motor, compare the speed of the motor to a first threshold value, and drive the motor using centerline commutation when the speed of the motor is greater than the first threshold value.

In another embodiment, the invention provides a method of controlling commutation of a BLDC motor in a power tool. The method includes controlling a plurality of switches to drive the motor using a first commutation scheme, determining a speed of the motor, comparing the speed of the motor to a first threshold value when driving the motor using the first commutation scheme, and controlling the plurality of switches to drive the motor using a second commutation scheme when the speed of the motor is greater than the first threshold value.

In another embodiment, the invention provides a power tool that includes an electronically commutated motor, a switching assembly including a plurality of switches, and a controller. The controller is configured to control the plurality of switches to drive the motor using a first commutation scheme, determine a speed of the motor, compare the speed of the motor to a first threshold value, control the plurality of switches to drive the motor using a second commutation scheme when the speed of the motor is greater than the first threshold value, compare the speed of the motor to a second threshold value when driving the motor using the second commutation scheme, and control the plurality of switches to drive the motor using the first commutation scheme when the speed of the motor is below the second threshold value. The first threshold value is greater than the second threshold value.

Other aspects of the invention will become apparent by consideration of the detailed description and accompanying drawings.

BRIEF DESCRIPTION OF THE DRAWINGS

FIG. 11 is a diagram of heat generated by the switching FETs during low-side centerline commutation and in a first low-speed operational mode.

FIG. 12 is a diagram of heat generated by FETs during high-side centerline commutation and in the first low-speed operational mode.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention described herein relates to a power tool (e.g., a hand-held power tool) that includes a brushless or electronically commutated motor (e.g., a brushless direct current ["BLDC"] motor), a switching array, and a controller. The controller is configure to selectively control the switching of the switches within the switching array to implement at least a first commutation mode or scheme and a second commutation mode or scheme for the BLDC motor. The commutation modes include, for example, a centerline commutation mode and a pulse-width modulated ("PWM") commutation mode. The controller is further configured to automatically transition from either the PWM commutation mode to the centerline commutation or the centerline commutation mode to the PWM commutation mode based on one or more characteristics of the motor or power tool (e.g., motor speed, trigger pull, motor current draw, etc.). Additionally, once the power tool motor is being driven in the centerline commutation mode, the heat that is generated by freewheeling currents can be evenly distributed among the switches of the switching array by alternating between high-side centerline commutation (i.e., high-side in relation to the positive battery voltage being provided to the motor) and low-side centerline commutation (i.e., low-side in relation to the positive battery voltage). The brushless motor systems, devices, and control methods are described below with respect to a variety of power tools.

Figure 1A:
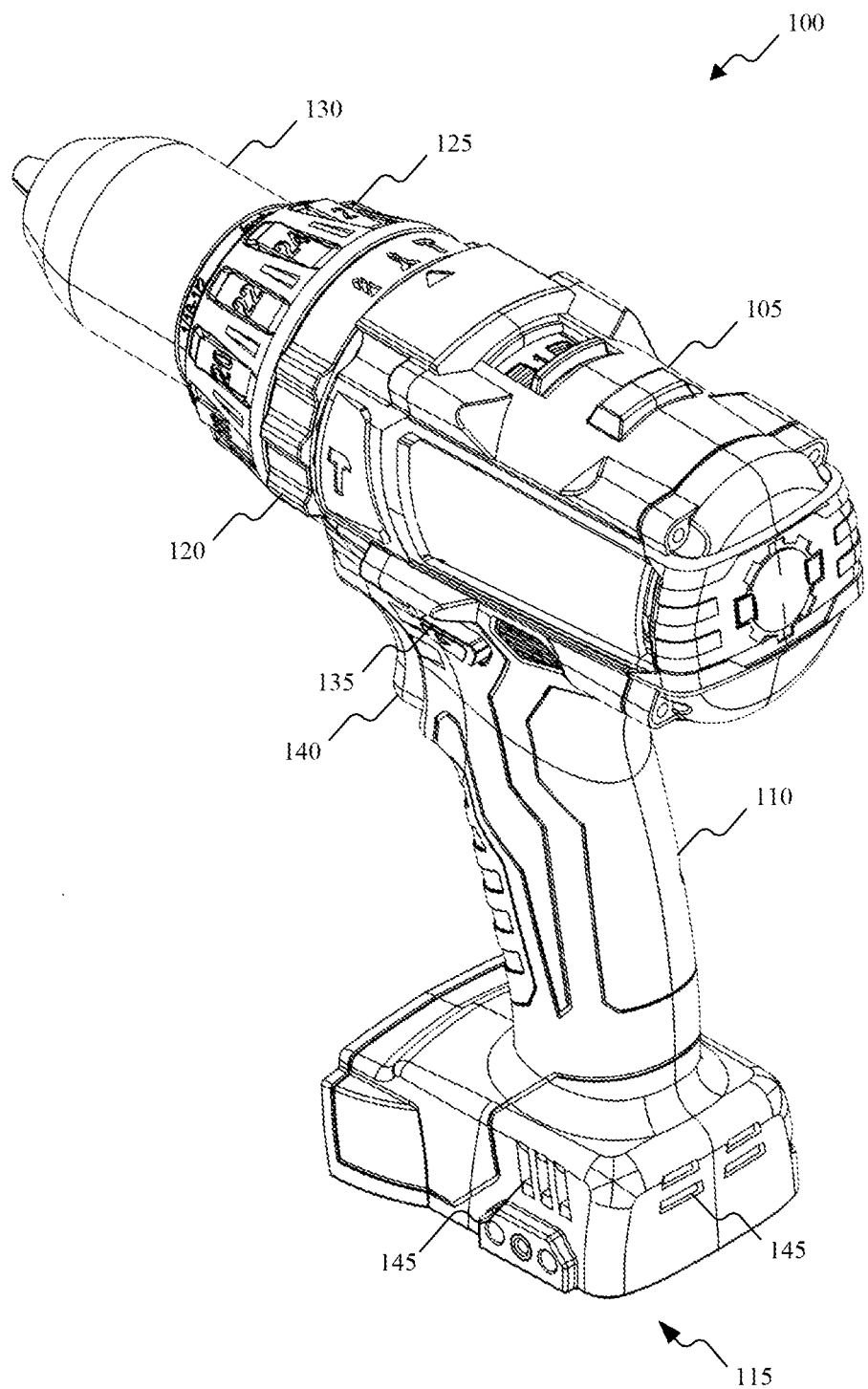
FIG. 1A illustrates a power tool including a brushless motor according to an embodiment of the invention.

FIGS. 1A-1D illustrate various power tools (e.g., hand-held power tools) that include brushless motors (e.g., BLDC motors). The hand-held power tool illustrated in FIG. 1A is a hammer drill/driver ("hammer drill") 100. The hammer drill 100 includes an upper main body 105, a handle portion 110, a battery pack receiving portion 115, a mode selection portion 120 (e.g., for selecting among a drilling mode, a driving mode, a hammer mode, etc.), a torque adjustment dial or ring 125, an output drive device or mechanism (e.g., a chuck) 130, a forward/reverse selection button 135, a trigger 140, and air vents 145. In some embodiments, the hammer drill 100 also includes a worklight, and the battery pack receiving portion 115 receives a battery pack and includes a plurality of terminals.

Figure 1B:
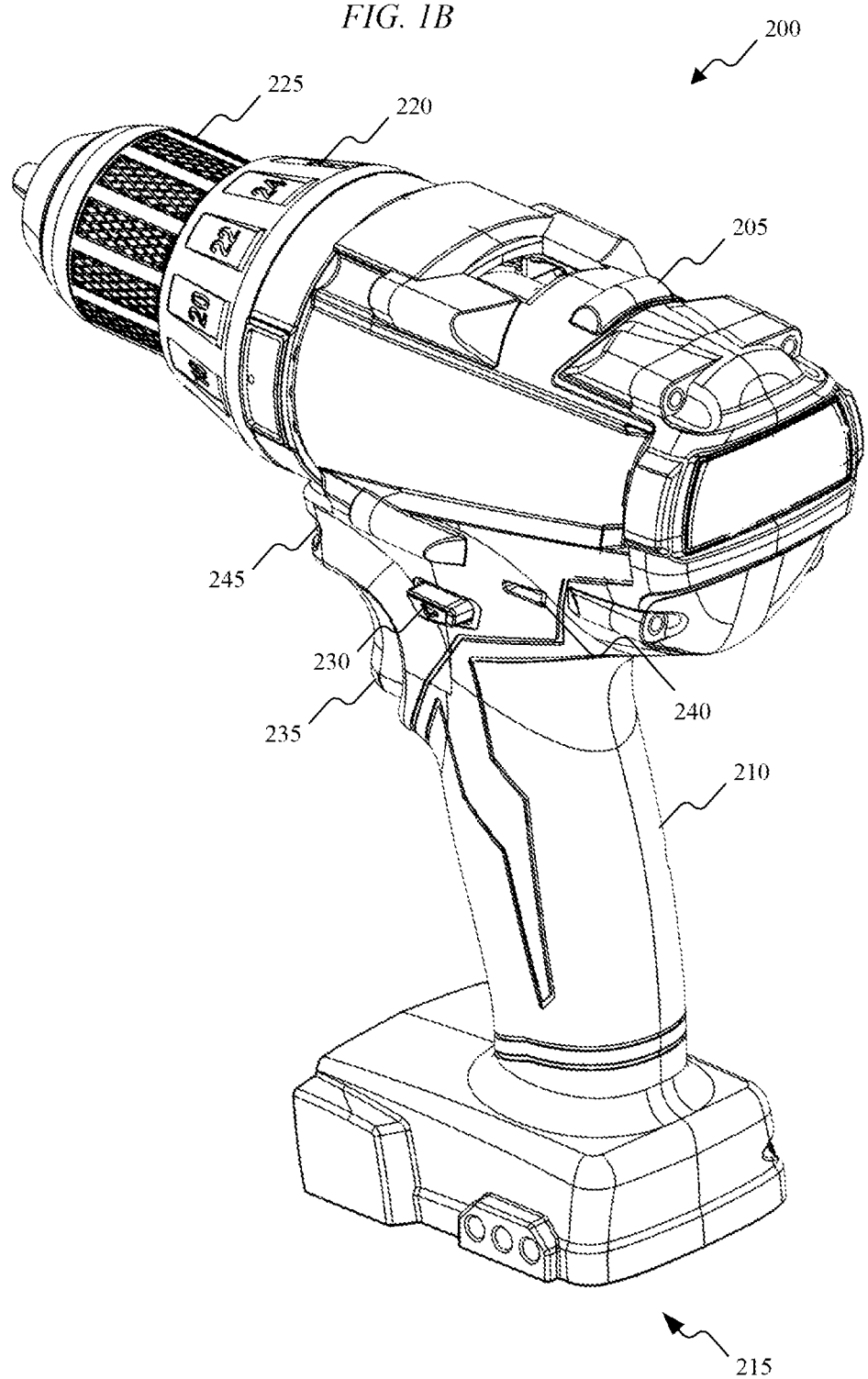
FIG. 1B illustrates a power tool including a brushless motor according to another embodiment of the invention.

The hand-held power tool illustrated in FIG. 1B is a drill/driver 200. The drill/driver 200 includes an upper main body 205, a handle portion 210, a battery pack receiving portion 215, a torque adjustment dial or ring 220, an output drive device or mechanism 225, a forward/reverse selection button 230, a trigger 235, and air vents 240. In some embodiments, the drill/driver 200 also includes a worklight, and the battery pack receiving portion 215 receives a portion of a battery pack and includes a plurality of terminals.

Figure 1C:
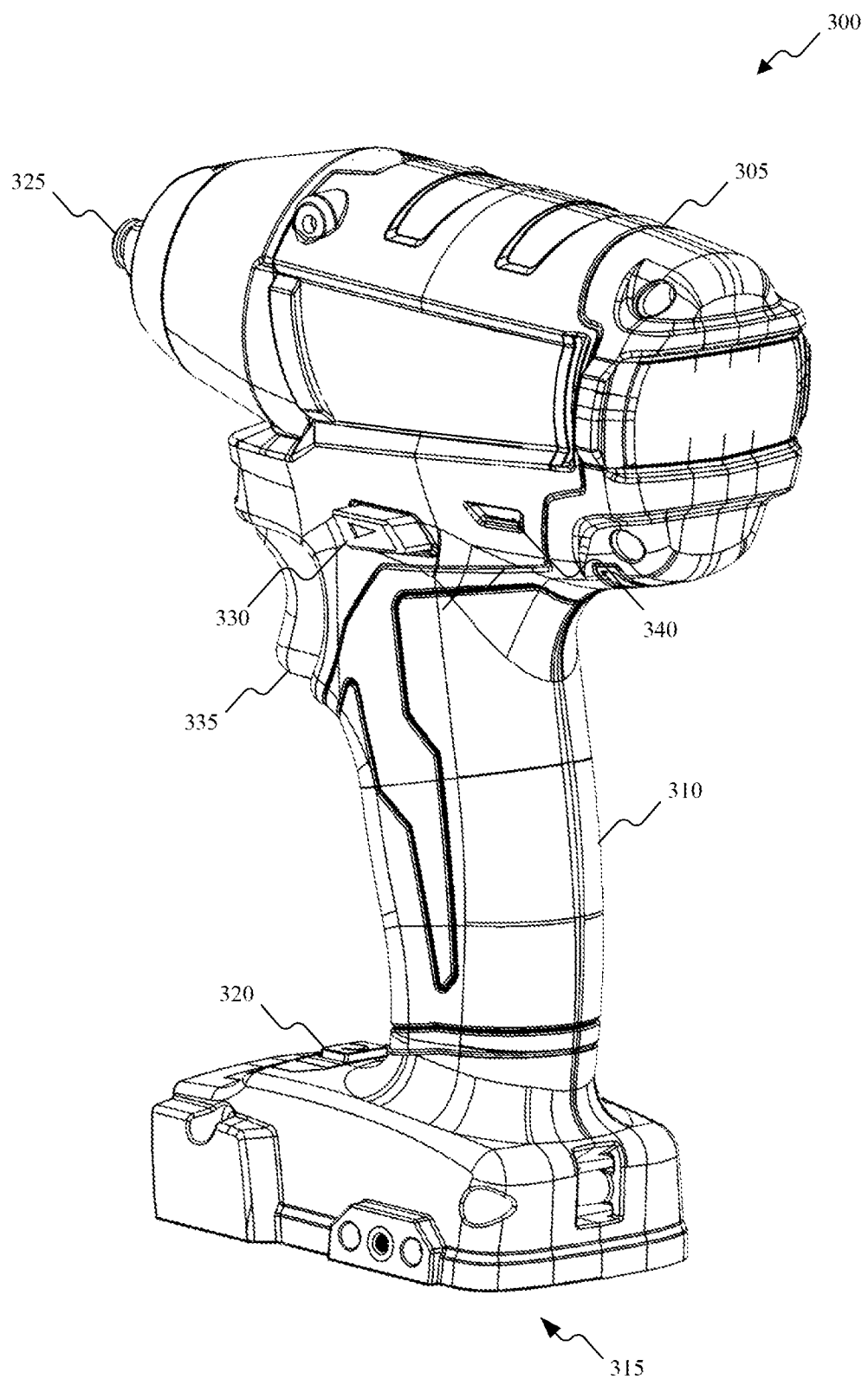
FIG. 1C illustrates a power tool including a brushless motor according to another embodiment of the invention.

The hand-held power tool illustrated in FIG. 1C is an impact wrench 300. The impact wrench 300 includes an upper main body 305, a handle portion 310, a battery pack receiving portion 315, torque and/or speed selection switches 320, an output drive device or mechanism 325, a forward/reverse selection button 330, a trigger 335, and air vents 340. In some embodiments, the impact wrench 300 also includes a worklight, and the battery pack receiving portion 315 receives a portion of a battery pack and includes a plurality of terminals.

Figure 1D:
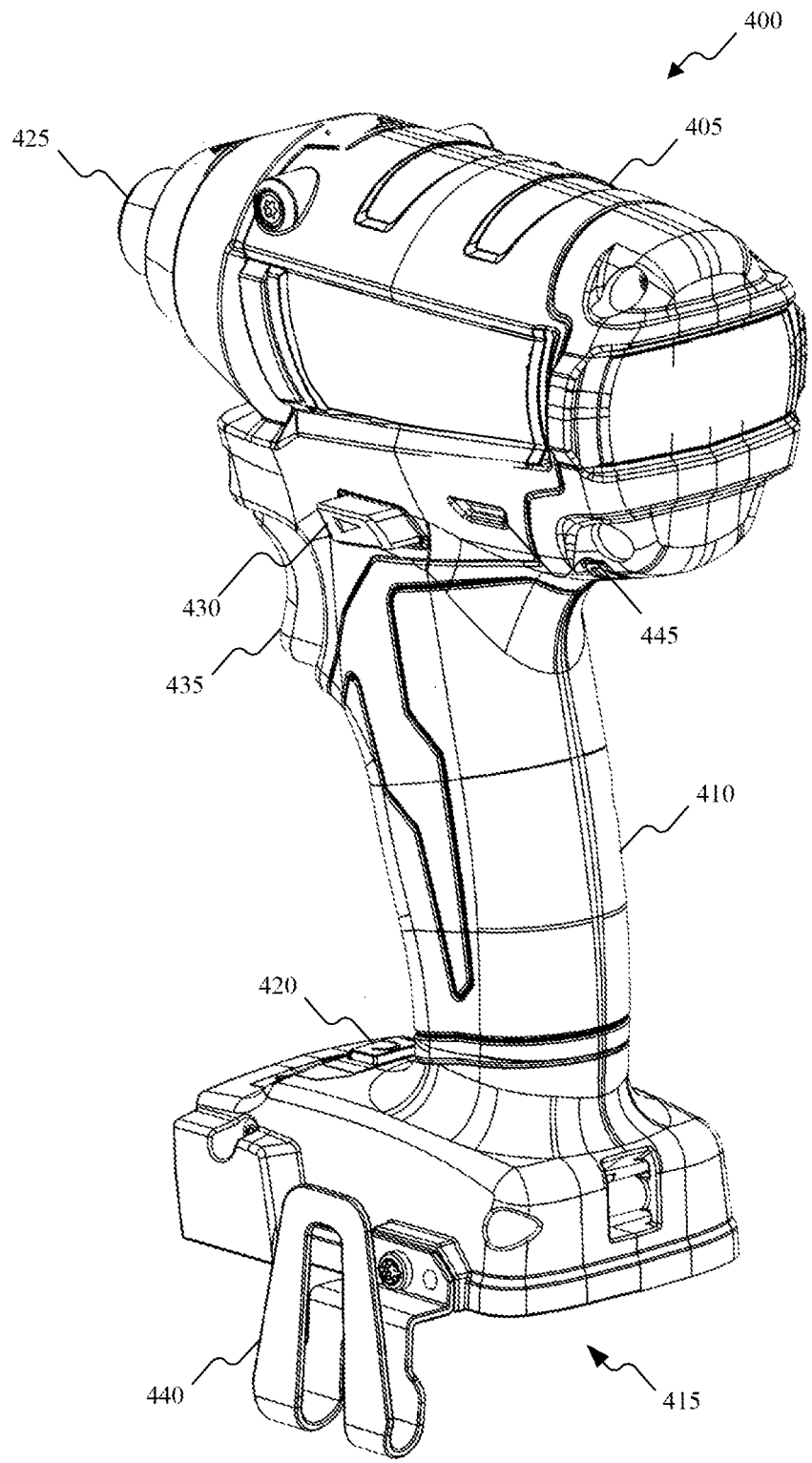
FIG. 1D illustrates a power tool including a brushless motor according to another embodiment of the invention.

The hand-held power tool illustrated in FIG. 1D is an impact driver 400. The impact driver 400 includes an upper main body 405, a handle portion 410, a battery pack receiving portion 415, torque and/or speed selection switches 420, an output drive device or mechanism 425, a forward/reverse selection button 430, a trigger 435, a belt clip 440 (optionally included on the hammer drill 100, the drill/driver 200, and the impact wrench 300), and air vents 445. In some embodiments, the impact driver 400 also includes a worklight, and the battery pack receiving portion 415 receives a portion of a battery pack and includes a plurality of terminals.

The number of terminals present in the receiving portions of the power tools 100, 200, 300, and 400 can vary based on the type of power tool. However, as an illustrative example, the receiving portion can include a battery positive ("B+") terminal, a battery negative ("B−") terminal, a sense or communication terminal, an identification terminal, etc. The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.). The identification terminal can be used by the battery pack or the hand-held power tool to identify the other of the battery pack or the hand-held power tool.

Figure 2:
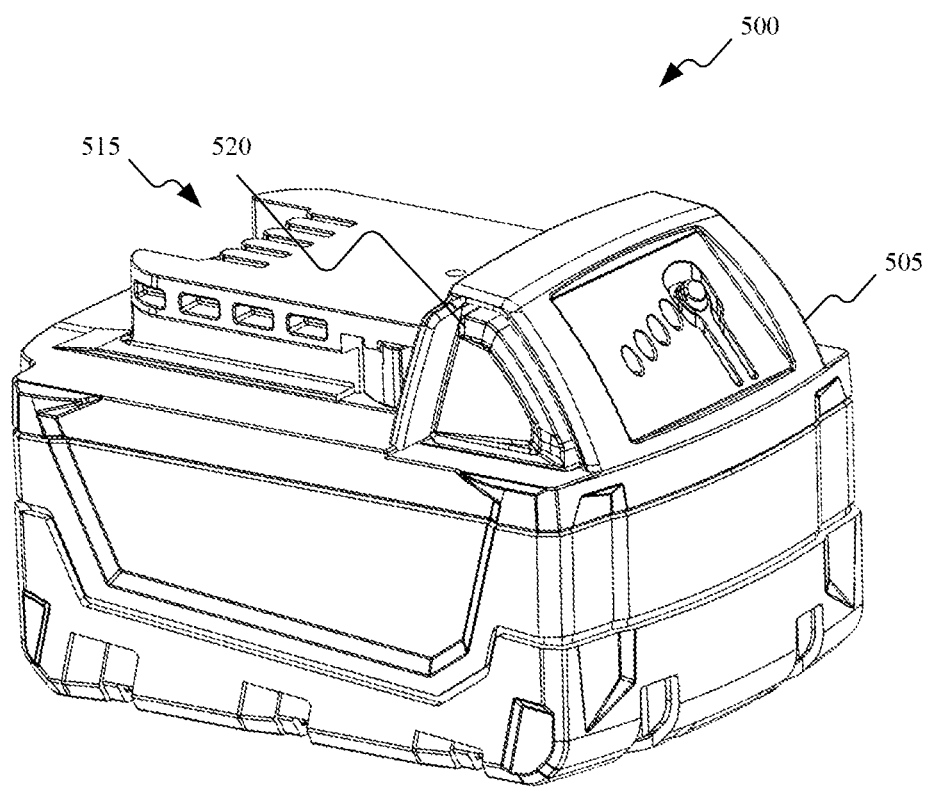
FIG. 2 illustrates a battery pack for powering the power tools of FIGS. 1A-1D.
Figure 3:
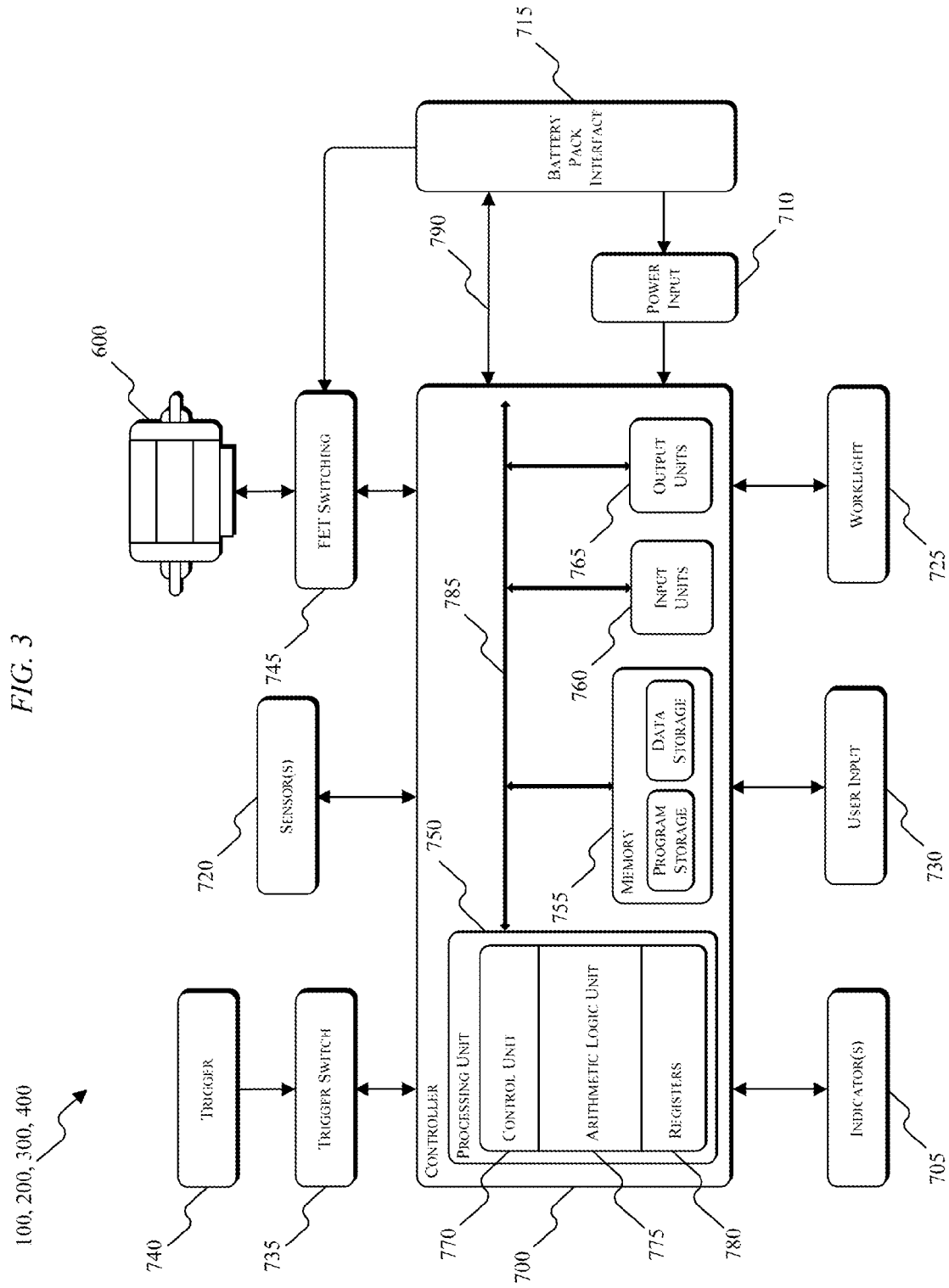
FIG. 3 illustrates a controller for the power tools of FIGS. 1A-1D according to an embodiment of the invention.

The hand-held power tools 100, 200, 300, and 400 described above receive power (i.e., voltage and current) from a battery pack, such as the battery pack 500 illustrated in FIG. 2. The battery pack 500 is connectable to and supportable by the power tools 100, 200, 300, and 400. The battery pack 500 includes a housing 505 and at least one rechargeable battery cell supported by the housing 505. The battery pack 500 also includes a support portion 515 for supporting the battery pack 500 on and coupling the battery pack 500 to a power tool, a coupling mechanism 520 for selectively coupling the battery pack 500 to, or releasing the battery pack 500 from, a power tool. In the illustrated embodiment, the support portion 515 is connectable to a complementary support portion on the power tool (e.g., the battery pack receiving portion 115, 215, 315, and 415).

The battery pack 500 includes a plurality of terminals and electrical connectors operable to electrically connect the power tool to, for example, the battery cells or a printed circuit board ("PCB") within the battery pack 500. The plurality of terminals includes, for example, a positive battery terminal, a ground terminal, and a sense terminal. The battery pack 500 is removably and interchangeably connected to a power tool to provide operational power to the power tool. The terminals are configured to mate with corresponding terminals of a power tool (e.g., within the battery pack receiving portions 115, 215, 315, and 415). The battery pack 500 substantially encloses and covers the terminals on the power tool when the pack 500 is positioned within the battery pack receiving portions 115, 215, 315, and 415. That is, the battery pack 500 functions as a cover for the opening and terminals of the power tool. Once the battery pack 500 is disconnected from the power tool, the terminals on the power tool are generally exposed to the surrounding environment. In this illustrated embodiment, the battery pack 500 is designed to substantially follow the contours of the power tool to match the general shape of the outer casing of the handle of the power tool, and the battery pack 500 generally increases (e.g., extends) the length of a grippable portion of the tool (i.e., a portion of the tool below the tool main body).

In some embodiments, the battery pack 500 includes 10 battery cells. In other embodiments, the battery pack 500 can include more or fewer battery cells. The battery cells can be arranged in series, parallel, or a series-parallel combination. For example, the battery pack can include a total of 10 battery cells configured in a series-parallel arrangement of five sets of two series-connected cells. The series-parallel combination of battery cells allows for an increased voltage and an increased capacity of the battery pack. In some embodiments, the battery pack 500 includes five series-connected battery cells. In other embodiments, the battery pack 500 includes a different number of battery cells (e.g., between 3 and 12 battery cells) connected in series, parallel, or a series-parallel combination in order to produce a battery pack having a desired combination of nominal battery pack voltage and battery capacity.

The battery cells are, for example, cylindrical 18650 battery cells (18 mm diameter and 65 mm length), such as the INR18650-15M lithium-ion rechargeable battery cell manufactured and sold by Samsung SDI Co., Ltd. of South Korea. In other embodiments, the battery cells are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 26650 battery cells (26 mm diameter and 65 mm length), 26700 battery cells (26 mm diameter and 70 mm length), etc.

The battery cells are lithium-based battery cells having a chemistry of, for example, lithium-cobalt ("Li—Co"), lithium-manganese ("Li—Mn"), or Li—Mn spinel. In some embodiments, the battery cells have other suitable lithium or lithium-based chemistries, such as a lithium-based chemistry that includes manganese, etc. The battery cells within the battery pack 1000 provide operational power (e.g., voltage and current) to the power tools. In one embodiment, each battery cell has a nominal voltage of approximately 3.6V, such that the battery pack has a nominal voltage of approximately 18V. In other embodiments, the battery cells have different nominal voltages, such as, for example, between 3.6V and 4.2V, and the battery pack has a different nominal voltage, such as, for example, 10.8V, 12V, 14.4V, 24V, 28V, 36V, between 10.8V and 36V, etc. The battery cells also have a capacity of, for example, between approximately 1.0 ampere-hours ("Ah") and 5.0 Ah. In exemplary embodiments, the battery cells have capacities of approximately, 1.5 Ah, 2.4 Ah, 3.0 Ah, 4.0 Ah, between 1.5 Ah and 5.0 Ah, etc.

The power tools 100, 200, 300, or 400 include a controller 700. The controller 700 is electrically and/or communicatively connected to a variety of modules or components of the power tools. For example, the illustrated controller 700 is connected to one or more indicators 705, a power input module 710, a battery pack interface 715, one or more sensors 720, a worklight 725, a user input module 730, a trigger switch 745 (connected to trigger 740), and a FET switching module 745 (e.g., including the switching or commutation FETs described below). In some embodiments, the trigger switch 735 is combined and integral with the controller 700 within a housing within the power tool. The controller 700 includes combinations of hardware and software that are operable to, among other things, control the operation of the power tool, activate the one or more indicators 705 (e.g., an LED), monitor the operation of the power tool, etc. The one or more sensors 720 include, among other things, one or more temperature sensors, one or more Hall Effect sensors, etc.

In some embodiments, the controller 700 includes a plurality of electrical and electronic components that provide power, operational control, and protection to the components and modules within the controller 700 and/or power tool. For example, the controller 700 includes, among other things, a processing unit 750 (e.g., a microprocessor, a microcontroller, or another suitable programmable device), a memory 755, input units 760, and output units 765. The processing unit 750 includes, among other things, a control unit 770, an arithmetic logic unit ("ALU") 775, and a plurality of registers 780, and is implemented using a known computer architecture, such as a modified Harvard architecture, a von Neumann architecture, etc. The processing unit 750, the memory 755, the input units 760, and the output units 765, as well as the various modules connected to the controller 700 are connected by one or more control and/or data buses (e.g., common bus 785). The control and/or data buses are shown generally for illustrative purposes. The use of one or more control and/or data buses for the interconnection between and communication among the various modules and components would be known to a person skilled in the art in view of the invention described herein. In some embodiments, the controller 700 is implemented partially or entirely on a semiconductor (e.g., a field-programmable gate array ["FPGA"] semiconductor) chip, such as a chip developed through a register transfer level ("RTL") design process.

The memory 755 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 750 is connected to the memory 755 and executes software instructions that are capable of being stored in a RAM of the memory 755 (e.g., during execution), a ROM of the memory 755 (e.g., on a generally permanent basis), or another non-transitory computer readable medium such as another memory or a disc. Software included in the implementation of the power tool can be stored in the memory 755 of the controller 700. The software includes, for example, firmware, one or more applications, program data, filters, rules, one or more program modules, and other executable instructions. The controller 700 is configured to retrieve from memory and execute, among other things, instructions related to the control processes and methods described herein. The controller 700 can also be configured to selectively control the conduction of high-side FETs and low-side FETs (i.e., for controlling the speed of the motor, for controlling heat generation and distribution, etc.), monitor temperatures associated with the FETs, monitor motor operation, monitor a direction of current flow, control current discharge from a battery pack, etc. In other constructions, the controller 700 includes additional, fewer, or different components.

The battery pack interface 715 includes a combination of mechanical (e.g., the battery pack receiving area 115, 215, 315, and 415) and electrical components (e.g., the plurality of terminals) configured to and operable for interfacing (e.g., mechanically, electrically, and communicatively connecting) a power tool with a battery pack (e.g., battery pack 500). For example, power provided by the battery pack 500 to one of the power tools 100, 200, 300, and 400, is provided through the battery pack interface 715 to a power input module 710. The power input module 710 includes combinations of active and passive components to regulate or control the power received from the battery pack 500 prior to power being provided to the controller 700. The battery pack interface 715 also supplies power to the FET switching module 745 to be switched by the switching FETs to selectively provide power to a motor 600. The battery pack interface 715 also includes, for example, a communication line 790 for providing a communication line or link between the controller 700 and the battery pack 500.

The trigger switch 735 is connected to the trigger 740 (e.g., the trigger 140, 235, 335, or 435) for controlling the power provided to the motor 600 through the switching FETs. In some embodiments, the amount of trigger pull detected by the trigger switch is related to or corresponds to a desired speed of rotation of the motor 600. In other embodiments, the amount of trigger pull detected by the trigger switch 735 is related to or corresponds to a desired torque or a desired power for the motor 600. The worklight 725 is controlled by the controller 700. In some embodiments, the worklight 725 is illuminated when the trigger 740 is pulled. In other embodiments, a dedicated switch or button is provided on the hand-held power tool or battery pack for activating the worklight without pulling the trigger 740. The worklight 725 can remain illuminated for a duration corresponding to an amount of time that the trigger 740 is pulled. The sensors 720 include, for example, one or more current sensors, one or more speed sensors, one or more Hall Effect sensors, one or more temperature sensors, etc. For example, the speed of the motor 600 can be determined or calculated using a plurality of Hall Effect sensors which sense the rotational position of a rotor.

The user input module 730 is operably coupled to the controller 700 to, for example, select a forward mode of operation or a reverse mode of operation, select a torque and/or speed setting for the power tool (e.g., using the torque and/or speed switches), etc. In some embodiments, the user input module 730 includes a combination of digital and analog input or output devices required to achieve a desired level of operation for the power tool, such as one or more knobs, one or more dials, one or more switches, one or more buttons, etc. The indicators 705 include, for example, one or more light-emitting diodes ("LED"). The indicators 705 can be configured to display conditions of, or information associated with, the power tool. For example, the indicators 705 are configured to indicate measured electrical characteristics of the power tool, the status of the power tool, etc.

The heat generated by FETs of the FET switching module 745 (e.g., switching or commutation FETs) in, for example, the power tools of FIGS. 1A-1D can be divided into three categories: (1) conduction losses; (2) switching/avalanche losses; and (3) freewheeling losses. Whether operating a motor using PWM commutation or centerline commutation, the motor generates approximately the same amount of conduction losses and freewheeling losses. However, centerline commutation can be used to minimize the amount of switching losses.

Figure 4A:
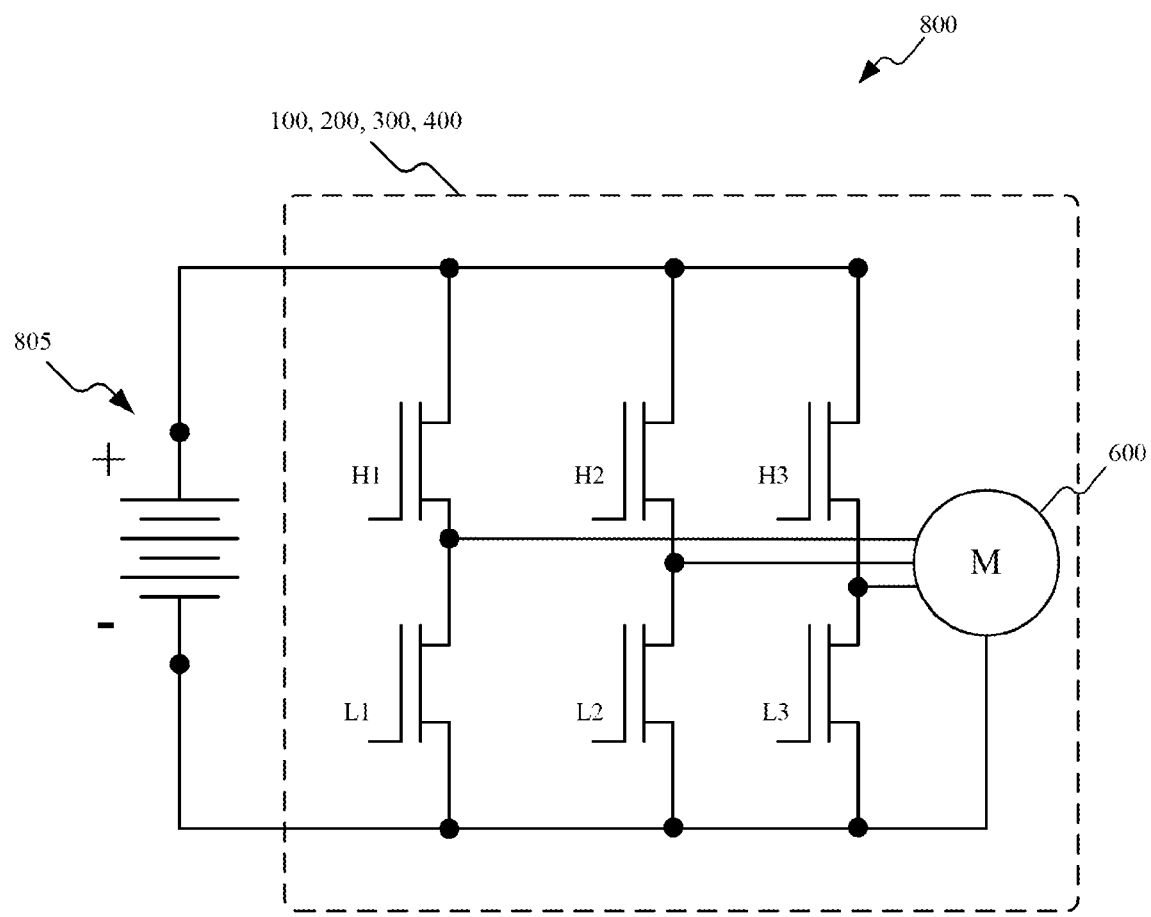
FIG. 4A illustrates a switching array for a power tool including a BLDC motor according to an embodiment of the invention.

FIG. 4A illustrates a FET switching array 800 for a power tool including a BLDC motor, such as the power tools 100, 200, 300, and 400. The switching array 800 includes three high-side FETs, H1, H2, and H3, and three low-side FETs, L1, L2, and L3 each having a first or conducting state and a second or non-conducting state. The switching array 800 is used to selectively apply power form the power source 805 (e.g., battery pack 500) to the motor 600. The specific manner in which the high-side switches and the low-side switches are controlled is described below.

Centerline commutation is achieved using the switching array 800 by having a speed control FET on (i.e., conducting) for a desired amount of time in the middle of each commutation phase of the motor 600. For example, if a FET has a 50% duty cycle, the FET can be off for the first 25% of the phase, on for the middle 50% of the phase, and then off for the last 25% of the phase. In such an implementation, there are only two switching events per commutation phase. However, unlike PWM commutation, centerline commutation relies on precise speed and location measurements or determinations for switching (e.g., at 25% and 75% of the commutation phase). The speed and location measurements or determinations used during centerline commutation are made using, for example, Hall-effect sensors.

Figure 4B:
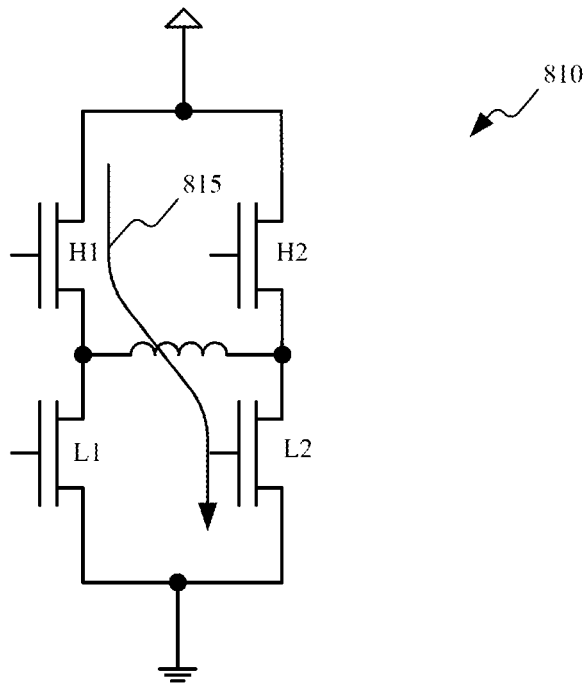
FIG. 4B illustrates current flow and heat generation resulting from low-side centerline commutation.
Figure 4C:
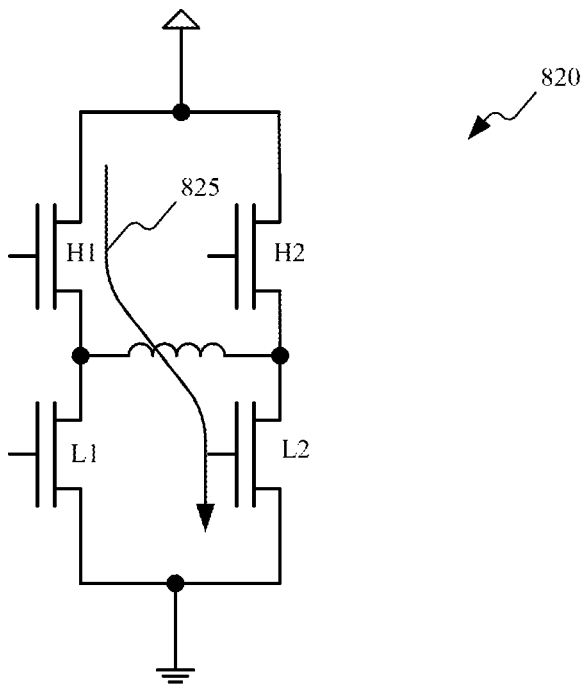
FIG. 4C illustrates current flow and heat generation resulting from high-side centerline commutation.

Another aspect of using centerline commutation, at even low-to-moderate power levels, are diode freewheeling currents that cause either the high-side FETs or the low-side FETs to heat up, depending upon which switches are being used to control motor speed. As a result, in some embodiments (described below), instead of controlling speed exclusively using the high-side FETs or the low-side FETs, the high-side FETs and low-side FETs are periodically switched or alternated to evenly distribute the heat generated by freewheeling currents. FIG. 4B is a diagram 810 of a high-side FET, H1, conducting, a low-side FET, L2, being used for speed control, and a high-side FET, H2, that heats up as a consequence of the freewheeling current resulting from the current 815 flowing through the FET, H1, and the FET, L2. FIG. 4C is a diagram 820 of a high-side FET, H1, being used for speed control, a low-side FET, L2, conducting, and a low-side FET, L1, that heats up as a consequence of the freewheeling current resulting from the current 825 flowing through the FET, H1, and the FET, L2.

Figure 5A:
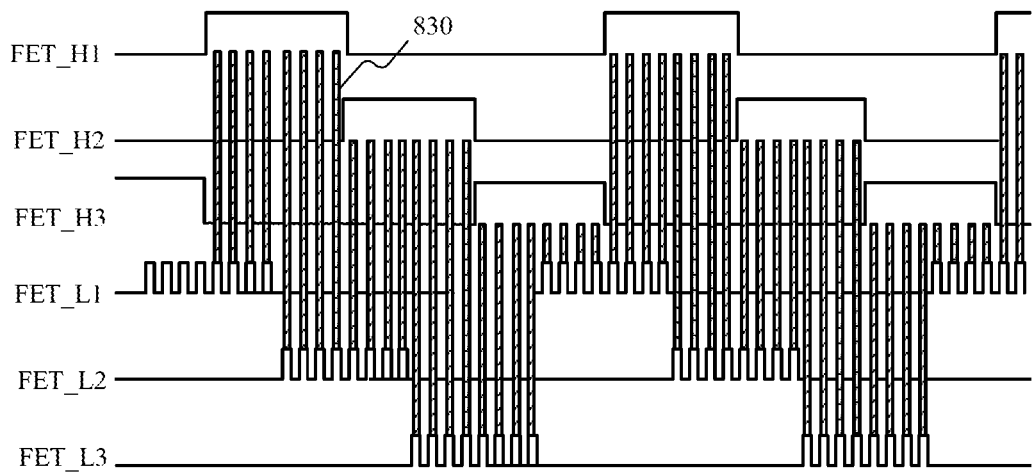
FIG. 5A is a diagram illustrating the operation of the switching array of FIG. 4 during pulse-width modulation ("PWM") commutation.

FIGS. 5A, 5B, 5C, 6, and 7 illustrate differences between PWM commutation or a PWM commutation scheme and centerline commutation or a centerline commutation scheme. FIG. 5A illustrates an implementation of PWM commutation. As illustrated in FIG. 5A, each of the high-side FETs H1, H2, and H3 is periodically conducting for an entire commutation phase. When one of the FETs H1, H2, or H3 stops conducting, the next high-side FET begins conducting. The low-side FETs L1, L2, and L3 are used as the speed control FETs and conduct at a determined PWM commutation frequency. During the overlap periods when the high-side FETs and the low-side FETs are both conducting, commutation 830 occurs (e.g., a commutation current is flowing through the respective FETs).

Figure 5B:
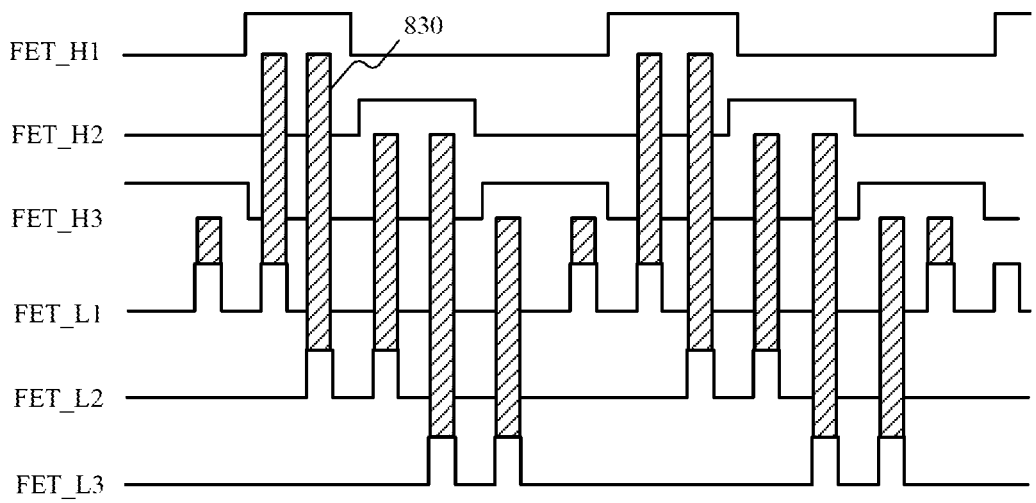
FIG. 5B is a diagram illustrating the operation of the switching array of FIG. 4 during centerline commutation.

FIG. 5B illustrates an implementation of centerline commutation. Again, each of the high-side FETs H1, H2, and H3 is periodically conducting for an entire commutation phase. When one of the FETs H1, H2, or H3 stops conducting, the next high-side FET begins conducting. The low-side FETs L1, L2, and L3 are used as the speed control FETs and each conducts for a specified portion of a conduction period (i.e., each low-side FET is turned on once per a commutation phase and off once per the commutation phase). In the illustrated implementation, each of the low-side FETs is turned on for a period of time in each of two adjacent commutation periods. As demonstrated by the differences between the commutation schemes of FIGS. 5A and 5B, there are significantly fewer commutation switching events when using centerline commutation as compared to PWM commutation for a given commutation cycle. In some embodiments, a commutation cycle generally refers to a sequence in which each of the switches in a switching array is activated for either commutation or speed control without repetition. In other embodiments, a commutation cycle can be based on and refer to a certain amount of time, angular rotation (e.g., of a rotor), etc., and can vary based on the construction of the motor.

Figure 5C:
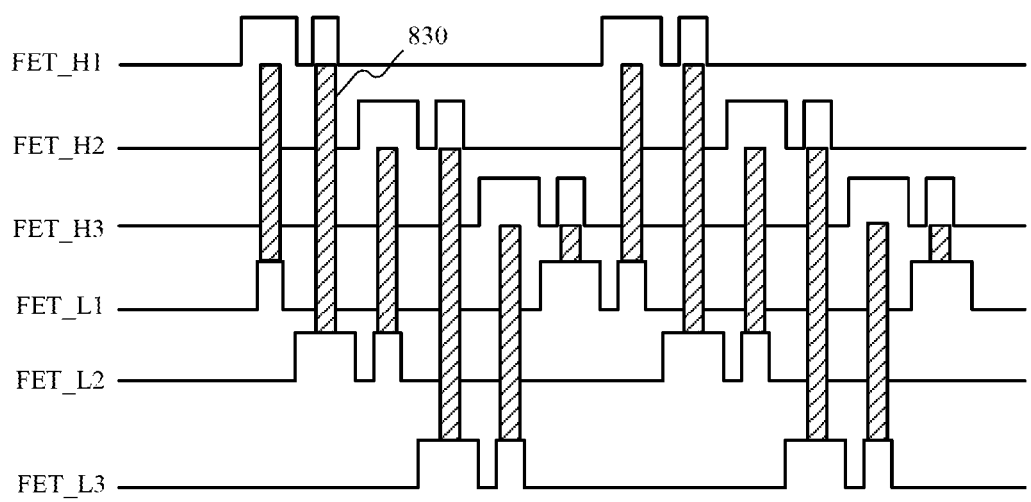
FIG. 5C is a diagram illustrating the operation of the switching array of FIG. 4 during combined high-side and low-side centerline commutation.

FIG. 5C illustrates an implementation of centerline commutation in which the speed control is alternated between the high-side FETs and the low-side FETs. The commutation scheme illustrated in FIG. 5C is similar to that of FIG. 5B, but, as is described in greater detail below, the heat generated by freewheeling currents using the commutation scheme of FIG. 5C is distributed approximately evenly among the FETs H1, H2, H3, L1, L2, and L3 by alternating which bank of switches (e.g., high-side or low-side) is being used for speed control. In some embodiments, the high-side, low-side speed control is alternated in a different manner. For example, the high-side, low-side speed control can be alternated each cycle, after a predetermined number of cycles, etc.

Figure 6:
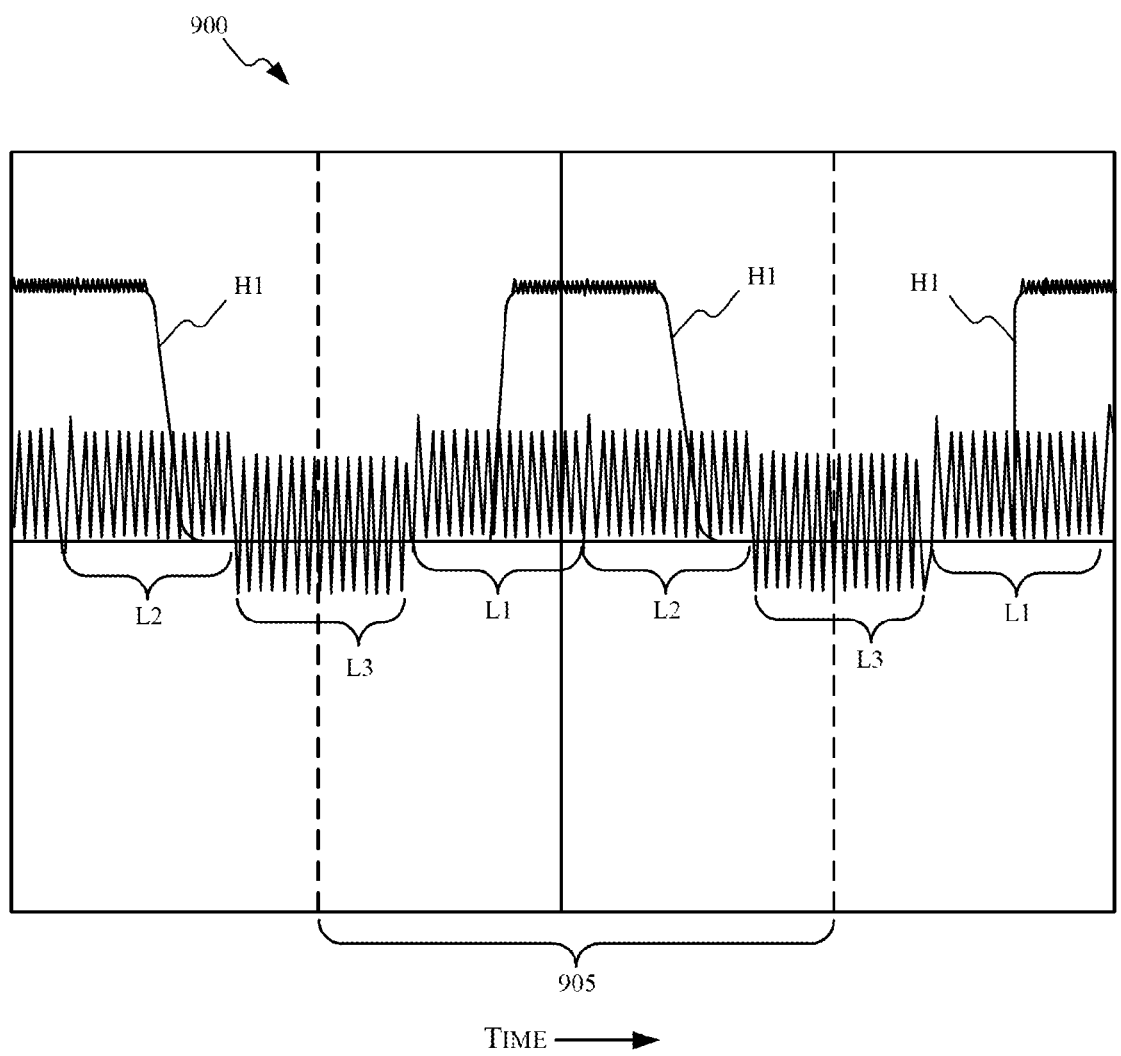
FIG. 6 illustrates switch activation through a commutation phase of a motor using PWM commutation.
Figure 7:
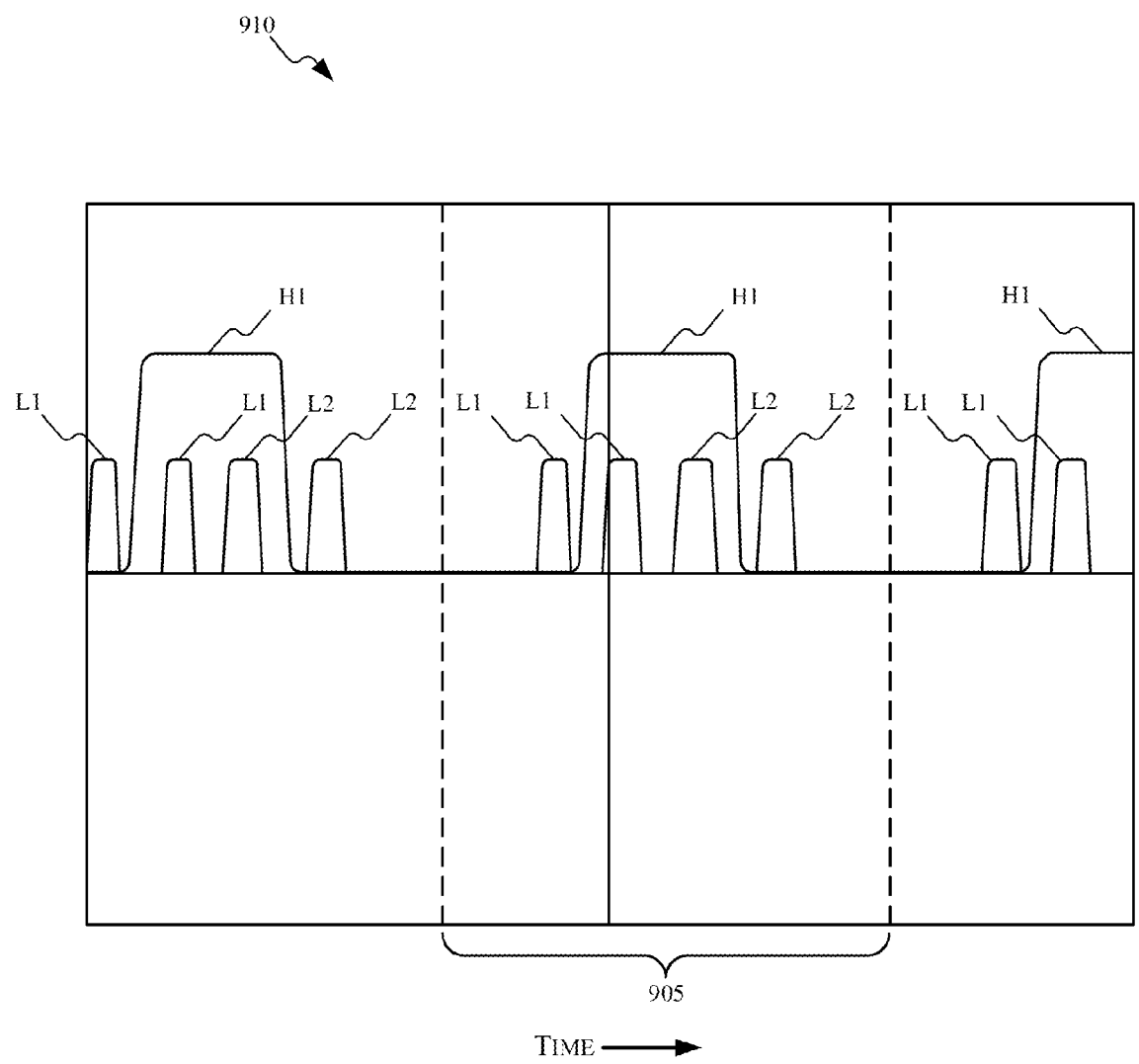
FIG. 7 illustrates switch activation through a commutation phase of a motor using centerline commutation.

FIG. 6 provides a graphical illustration 900 of the PWM commutation scheme of FIG. 5A. As illustrated in FIG. 6, a high-side FET (e.g., H1), is conducting at three different times. The low-side FETs L1, L2, and L3 are correspondingly switched on and off using PWM to achieve the conduction previously shown in FIG. 5A. The commutation portion 905 represents a commutation cycle. FIG. 7 provides a graphical illustration of the commutation scheme of FIG. 5B. Again, a high-side FET (e.g., H1), is conducting at three different times. The low-side FETs L1, L2, and L3 are correspondingly switched on and off using centerline commutation. The illustrated low-side FET current pulses correspond to the low-side FETs L1 and L2 being used for speed control.

In addition to implementing either a PWM commutation scheme or a centerline commutation scheme when driving a power tool motor, PWM commutation and centerline commutation can also be used in combination when driving the power tool motor. For example, for power tools (e.g., drills, drill drivers, hammer drills, etc.), smooth operation at low speeds is desired when a user only slightly pulls the power tool's trigger. To achieve this, PWM commutation is used to achieve smooth operation of the power tool at low speeds because PWM does not rely on detailed position information for less than approximately 30° of motor revolution. Commutation schemes having fewer switching events than PWM typically only work well when the speed and position of the motor are known or can be accurately determined.

As such, when the power tool motor is initially rotating, the power tool's controller controls commutation such that it runs in a first or PWM commutation mode to achieve smooth start-up operation. The motor operates using PWM commutation until the motor is rotating at a predictable or consistent speed. Once the motor is at the predictable or consistent speed, the motor is transitioned to a second or centerline commutation mode. When transitioning from PWM commutation to centerline commutation, hysteresis is used between commutation modes to prevent rapid switching between PWM commutation and centerline commutation (i.e., a speed threshold value for transitioning from PWM commutation to centerline commutation is higher than a speed threshold value for transitioning from centerline commutation to PWM commutation).

Both centerline commutation and PWM commutation have approximately the same total on-time per commutation cycle. However, operating the power tool motor using centerline commutation can result in the motor operating at a slightly different speed than when operated using PWM commutation because motor inductance does not limit motor current as much during centerline commutation as it does during PWM commutation. To make up for this change in motor speed, a precise step in applied power (e.g., up or down) is used to make a smooth transition from the first speed (during PWM commutation) to the second speed (during centerline commutation). For example, one implementation of the invention uses a programmable microcontroller or processor, such as controller 700, to control the power applied to the motor during transitions between commutation schemes.

Additionally, because of the potential variance in speed between commutation modes and the motor frequency being near the 1 kHz to 6 kHz range of frequencies (i.e., audible to humans), the motor produces a slightly different sound when using centerline commutation as compared with PWM commutation. To prevent a user from hearing or noticing this difference in sound, the PWM commutation frequency is controlled to blend as closely as possible with the centerline commutation frequency during the transition. In some embodiments, the centerline commutation pulse can also be broken up slightly into several PWM pulses which are centered in the overall commutation cycle during the PWM to centerline commutation transition. Such a technique can further reduce how abruptly the sound of the motor changes when transitioning from PWM to centerline commutation, and vice versa. Additionally, in some embodiments, approximately the same phase advance is maintained before and after switching between PWM and centerline commutation modes. In other embodiments, the phase angle is shifted slightly during the transition between commutation modes to optimize efficiency.

Figure 8:
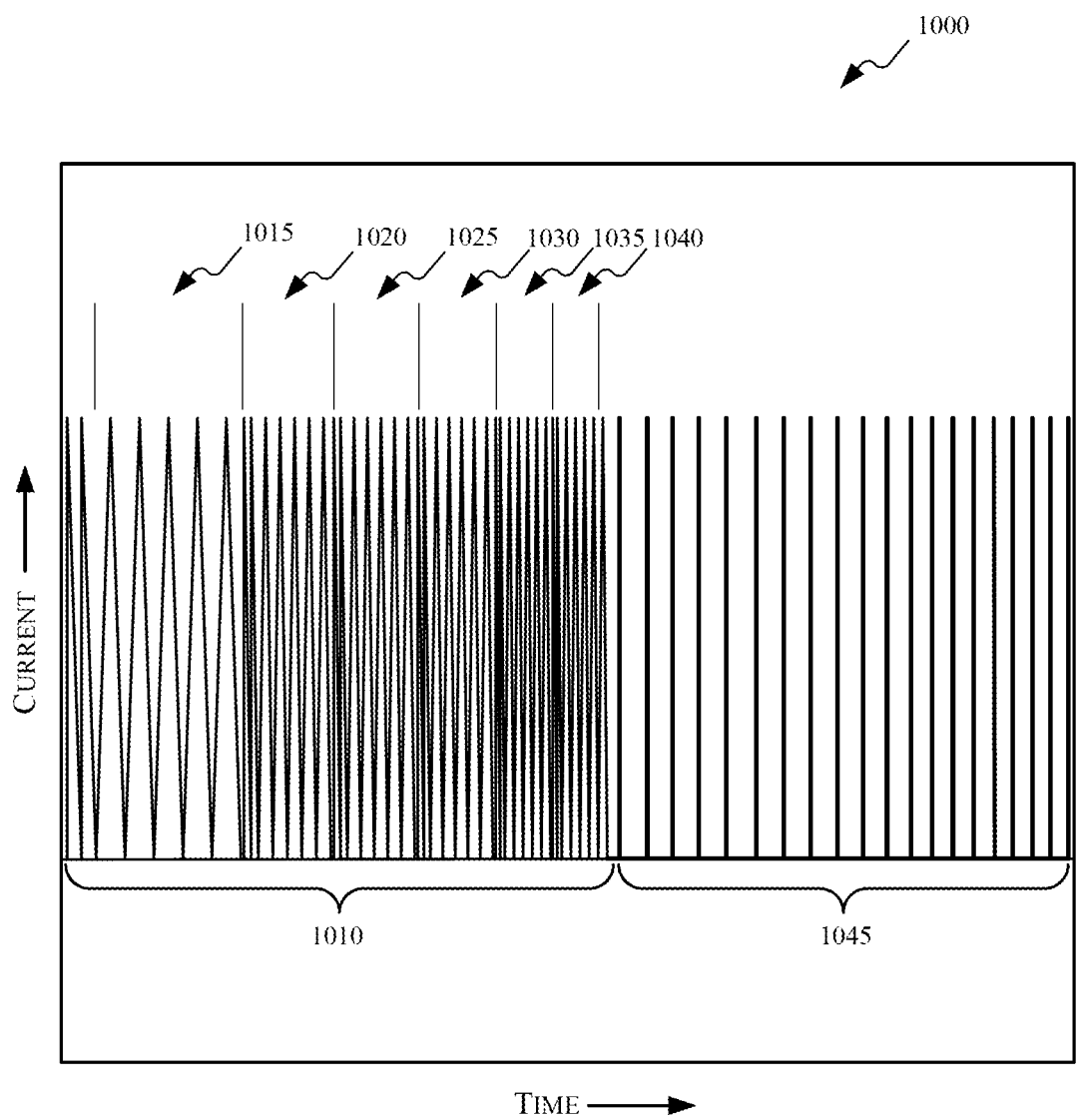
FIG. 8 illustrates a transition between PWM commutation and centerline commutation according to an embodiment of the invention.
Figure 9:
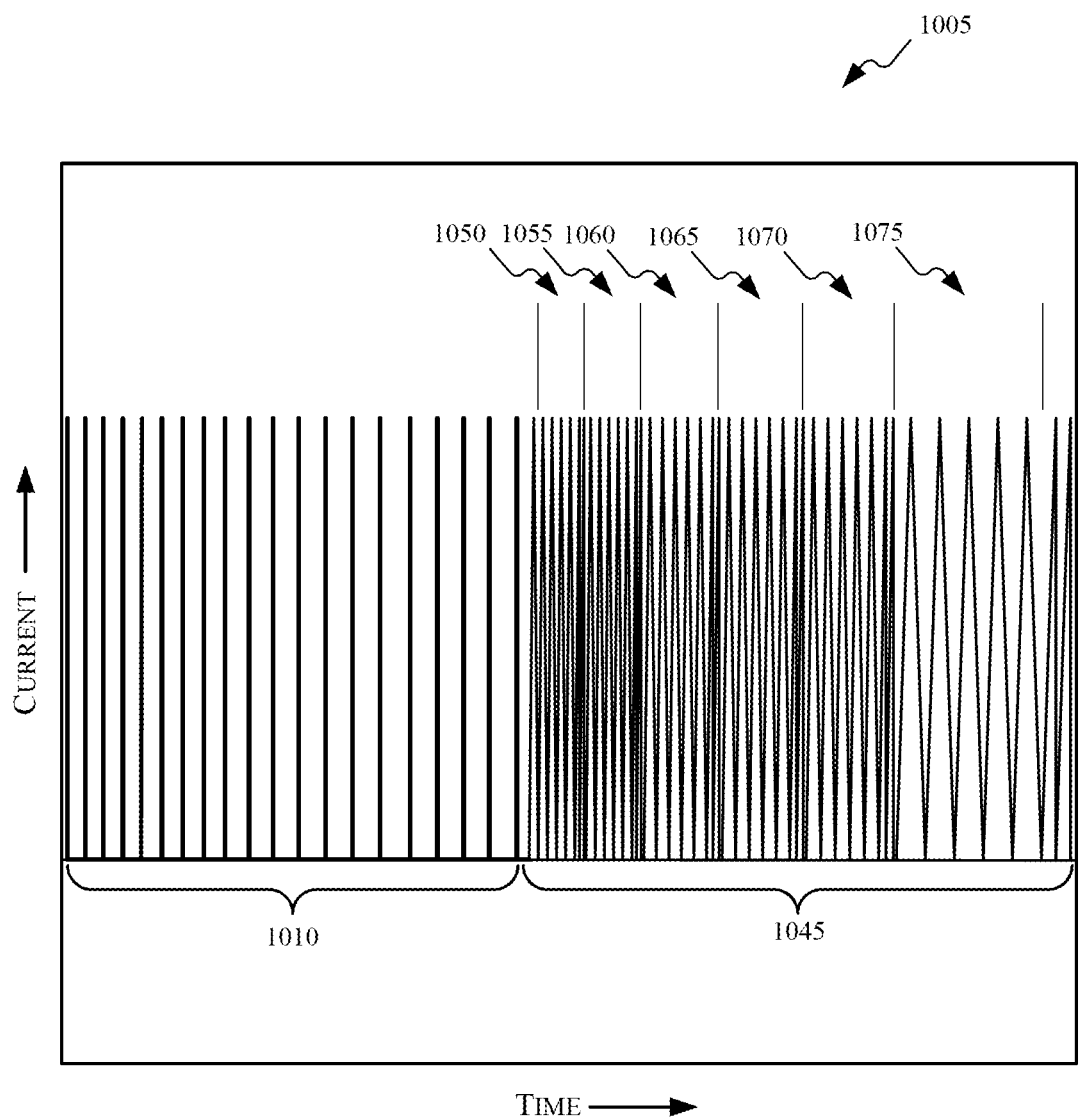
FIG. 9 illustrates a transition between centerline commutation and PWM commutation according to an embodiment of the invention.

FIGS. 8 and 9 illustrate a transition from PWM commutation to centerline commutation on startup, and the transition from centerline commutation to PWM commutation when a tool becomes heavily loaded, respectively. The transition from PWM commutation to centerline commutation occurs when the speed becomes greater than a first threshold value or first threshold speed value, such as, for example, 2500 RPM. The transition from centerline commutation to PWM commutation occurs when the speed of the tool drops below a second threshold value or threshold speed value, such as, for example, 2000 RPM. These thresholds are exemplary, and other values can be used. However, a characteristic hysteresis between the transition from PWM commutation and centerline commutation is used in various embodiments of the invention. In some embodiments, the transition from PWM commutation to centerline commutation occurs at a motor speed of between approximately 1000 RPM and approximately 5000 RPM, at approximately 10% of full motor speed, etc. The transition from PWM commutation to centerline commutation can also be set based on the no-load speed of the motor. The speed of the motor is determined based on Hall Effect sensor signals and the appropriate times for phase changes can be determined based on the determined speed. In some embodiments, the threshold for transitioning between centerline commutation and PWM commutation occurs at a speed of between approximately 1000 RPM and 5000 RPM, at approximately 10% of full motor speed, etc. The transition from centerline commutation to PWM commutation can also be set based on the no-load speed of the motor. In some embodiments, the threshold speed for transitioning from PWM commutation to centerline commutation is always greater than the threshold speed for transitioning from centerline commutation to PWM commutation. In some embodiments, the thresholds for transitioning between PWM commutation and centerline commutation can be dynamically modified or adjusted based on, for example, battery voltage, no-load speed, etc. The threshold values for switching between PWM commutation and centerline commutation can be based on a mapping function for the speed and the operational state of the motor.

With reference to FIG. 8, the diagram 1000 illustrates the speed of the motor increasing and transitioning from PWM commutation 1010 to centerline commutation 1045. With respect to time, each commutation portion 1015-1040 during the transition from PWM commutation to centerline commutation is active for a shorter period time in order to gradually transition between the two commutation schemes. A similar but opposite transition is illustrated in FIG. 9 with commutation portions 1050-1075 as the speed of the motor is reduced past the second threshold value.

Figure 10:
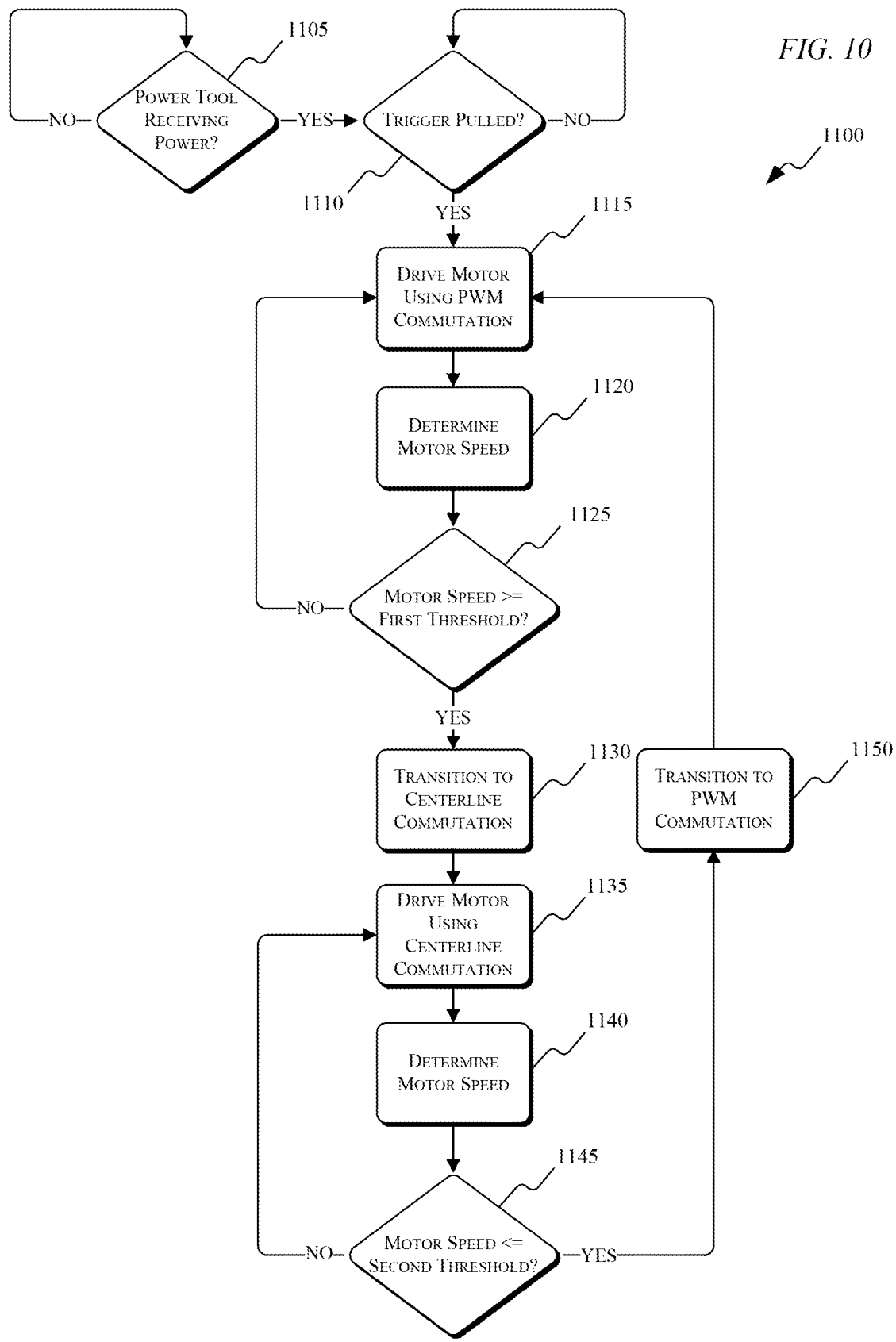
FIG. 10 is a process for switching between PWM commutation and centerline commutation.

A process 1100 for implementing a combination of PWM commutation and centerline commutation in a power tool is illustrated in FIG. 10. In order for the motor to be driven, power must be available to drive the motor. The process 1100 begins when the power tool is receiving or is capable of receiving power from a power source (e.g., battery pack 500 is connected to the power tool 100, 200, 300, or 400) (step 1105). At step 1110, the controller 700 determines whether a trigger has been pulled or activated. If the trigger has not been pulled or activated, the process 1100 remains at step 1110 until the trigger is pulled or activated. The pulling or activation of the trigger results in power being supplied from the power source to a motor. The activation of the trigger can correspond to, for example, a desired speed of the motor, a desired power to be applied to the motor, a desired current to be applied to the motor, etc.

Following the activation of the trigger at step 1110, the motor is driven in a PWM commutation mode or using a PWM commutation scheme (step 1115). During the PWM commutation mode, the speed of the motor is monitored using, for example, three Hall Effect sensors. The Hall Effect sensors are used by the controller 700 to calculate or otherwise determine (e.g., look-up) the speed at which the motor is rotating (step 1120). The determined speed of the motor is then compared to a first threshold value or first threshold speed value (step 1125). The first threshold value corresponds to a motor speed of, for example, 2500 RPM, as described above. If the speed of the motor is less than the first threshold value, the motor continues to be driven in the PWM commutation mode or using the PWM commutation scheme and steps 1115, 1120, and 1125 are repeated. If, at step 1125, the motor speed is greater than or approximately equal to the first threshold value, the process 1100 proceeds to step 1130 where the operation of the motor is switched or transitioned from the PWM commutation mode to the centerline commutation mode. The motor is subsequently driven in the centerline commutation mode or using a centerline commutation scheme (step 1135). During the centerline commutation mode, the speed of the motor is again calculated or otherwise determined as described above (step 1140). The determined speed of the motor is then compared to a second threshold value or second threshold speed value (step 1145). The second threshold value corresponds to a motor speed of, for example, 2000 RPM, as described above. If the speed of the motor is greater than the second threshold value, the motor continues to be driven in the centerline commutation mode or using the centerline commutation scheme, and steps 1135, 1140, and 1145 are repeated. If, at step 1145, the motor speed is less than or approximately equal to the second threshold value, the process 1100 proceeds to step 1150 where the operation of the motor is transitioned from the centerline commutation mode back to the PWM commutation mode.

As described above with respect to FIGS. 4B and 4C, heat is generated in non-conducting FETs as a result of freewheeling currents. When operating with one FET on and the other FET off (acting as a diode), freewheeling currents dictate most of the power dissipation at lower-power tool operation (e.g., less than 50 A peak currents). If the high-side FETs are used only for commutation and the low-side FETs for speed control, then the freewheeling currents go through the FET body diode above the active speed control FET on the low-side. This pushes the diode heat losses to the high-side FETs, causing them to increase in temperature more quickly than the low-side FETs. Alternatively, the low-side FETs can be left on during commutation and speed can be controlled using the high-side FETs. In this case, heat is steered to the low-side FET body diodes during freewheeling and cause the low-side FETs to generate heat.

As an extension of the process 1100, in some embodiments, the amount of time that each of the high-side and low-side FETs is left conducting (i.e., ON) can be selected or modified when using centerline commutation. For example, both the high-side FETs and low-side FETs can be turned off (i.e., non-conducting) for a portion of a cycle. In one embodiment, both the high-side and low-side FETs can be turned off for 80% of a 30° commutation phase. In this case, both the high-side and low-side FETs freewheel current through their body diodes. An alternative method is to leave one of the high-side or low-side FETs on for an entire commutation period and the opposite high-side or low-side FET can be turned on only during the time to apply power (i.e., to control speed). This has the advantage of having one of the FETs with a much lower voltage drop and power loss, and only the opposite FET freewheels the current through its diode (i.e. power losses due to freewheeling current are reduced).

Additionally, by sometimes controlling speed using the high-side FETs and sometimes controlling speed using the low-side FETs (e.g., alternately on consecutive cycles), the heat generated on the high-side FETs and the low-side FETs is distributed approximately evenly among the FETs. Such a technique results in improved overall performance of the semiconductor switches and heat sink capability. Such an optimization is particularly beneficial in a power tool application due to the cost, size, and cooling constraints related to the operation of internal electronics.

In some embodiments, the temperature of the heat sink associated with the high-side FETs and the heat sink associated with the low-side FETs is monitored to enable dynamic steering of heat to one of the high-side FETs and low-side FETs and to maintain temperature balance. For example, the freewheeling currents can be divided 50% high-side and 50% low-side, 40% low-side and 60% high-side, etc., in order to balance heat distribution evenly.

In some embodiments, the temperature of the FETs is monitored directly using a temperature sensor for each FET. The temperature sensor (e.g., a thermistor) can be positioned, for example, on the FET die or in proximity to each FET. In other embodiments, a measurement of body diode voltage drops and measurement of FET current are used. For example, the body diode voltage drop and the measured current through the FET can be used to infer the temperature of the diode and FET junction temperature. Freewheeling currents can then be directly steered to any of the 6 phases dynamically based on the determined temperatures. Such a technique can, for example, be implemented when currents are low, such as in non-stalling impact tools. For such applications, if the FET current and voltage drop are known, the body diode has a predictable temperature dependence.

FIGS. 11-17B illustrate the temperature of the FETs H1, H2, H3, L1, L2, and L3 under various operational conditions and using various commutation schemes. As also illustrated in some figures, the heat generated by freewheeling current losses can be balanced among the high-side FETs and the low-side FETs by combining high-side centerline commutation and low-side centerline commutation as described above (see FIG. 17B).

FIG. 11 is a diagram 1200 of low-side centerline commutation at a first low operational speed (e.g., approximately 7 amperes of current draw) and the corresponding rise in temperature of the switches H1, H2, H3, L1, L2, and L3.

FIG. 12 is a diagram 1205 of high-side centerline commutation at the first low operational speed and the corresponding rise in temperature of the switches H1, H2, H3, L1, L2, and L3.

Figure 13A:
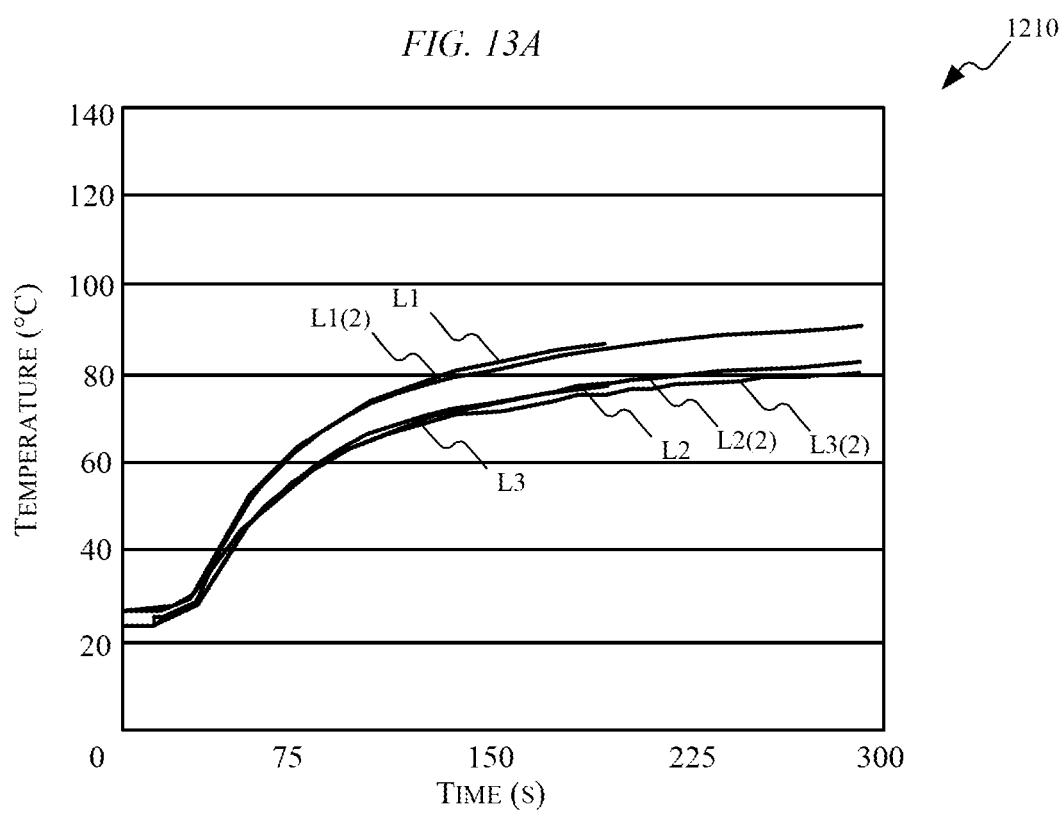
FIG. 13A is a diagram of heat generated by switching FETs during PWM commutation and in a second low-speed operational mode.

FIG. 13A is a diagram 1210 of the switching FETs during low-side PWM commutation at a second low operational speed (e.g., approximately 5 amperes of current draw) and the corresponding rise in temperature of the switching FETs L1, L2, and L3. The switches designated in FIG. 13A as L1, L2, and L3 correspond to a 5 kHz PWM commutation frequency, and the switches designated as L1(2), L2(2), and L3(2) correspond to a 20 kHz PWM commutation frequency.

Figure 13B:
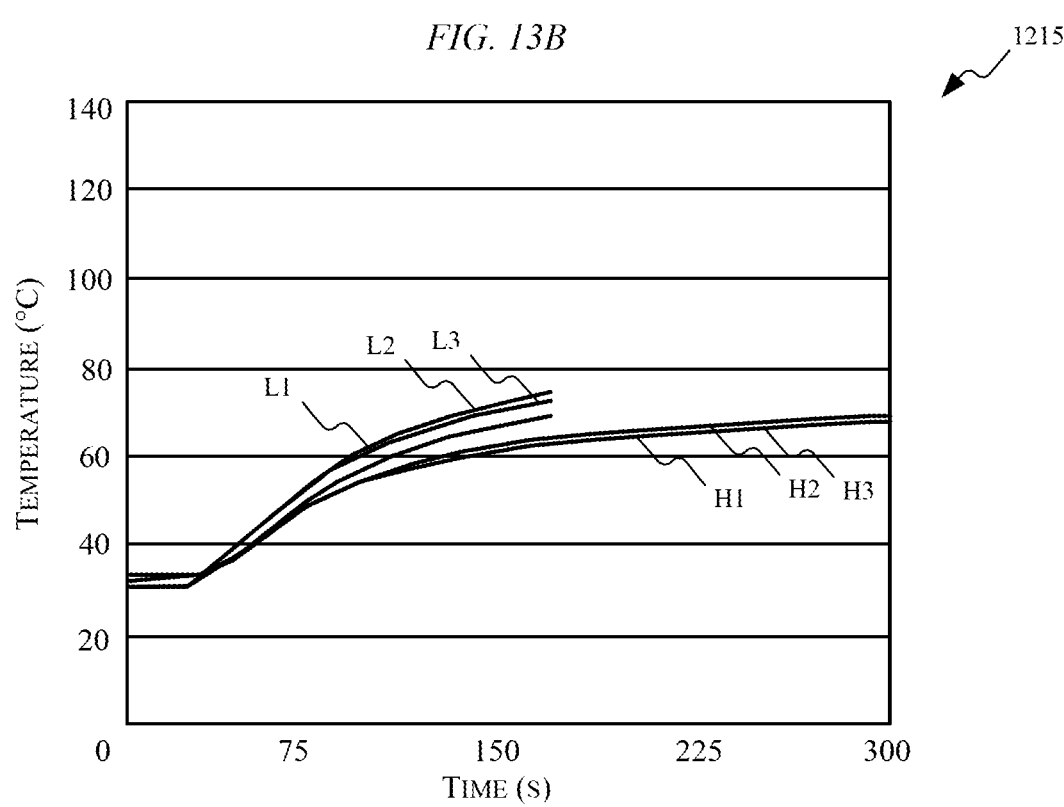
FIG. 13B is a diagram of heat generated by switching FETs during centerline commutation and in the second low-speed operational mode.

FIG. 13B is a diagram 1215 of the switching FETs during centerline commutation at the second low operational speed and the corresponding rise in temperature of the switching FETs. The switches designated in FIG. 13B as L1, L2, and L3 correspond to the switching FETs during low-side centerline commutation, and the switches designated as H1, H2, and H3 correspond to the switching FETs during high-side centerline commutation.

Figure 14A:
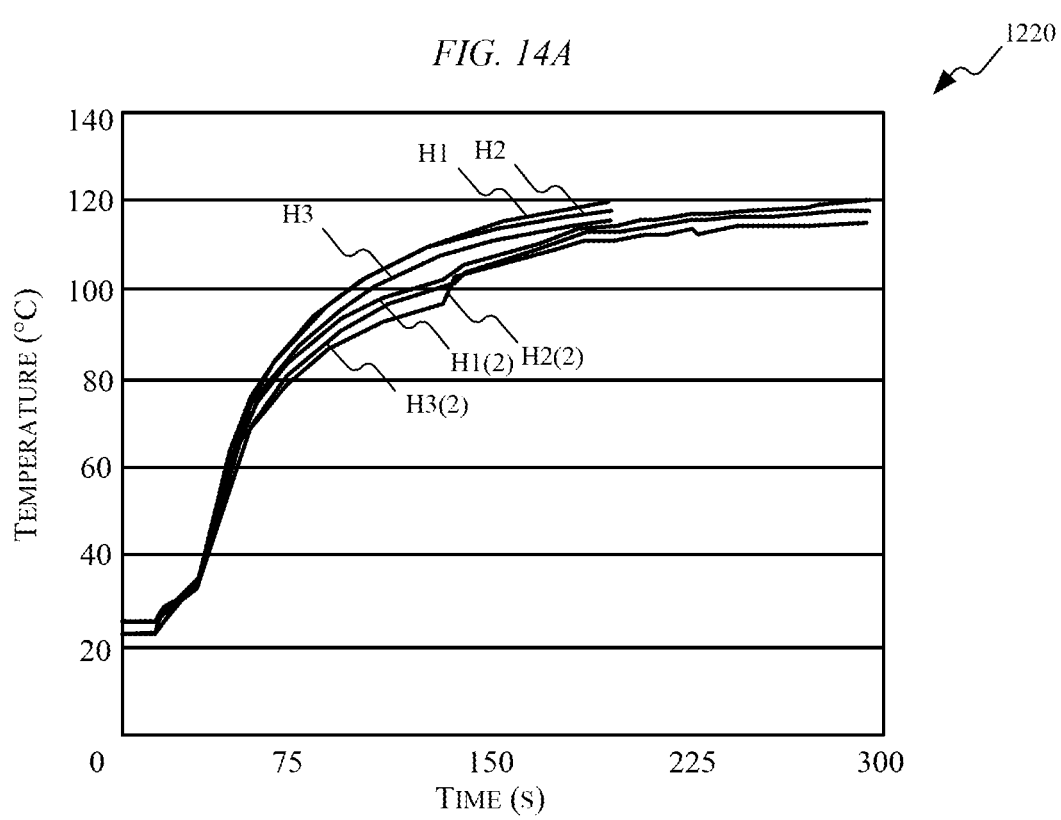
FIG. 14A is a diagram of heat generated by non-switching FETs during PWM commutation and in the second low-speed operational mode.

FIG. 14A is a diagram 1220 of the non-switching FETs during low-side PWM commutation at the second low operational speed and the corresponding rise in temperature of the non-switching FETs H1, H2, and H3. The switches designated in FIG. 14A as H1, H2, and H3 correspond to a 5 kHz PWM commutation frequency, and the switches designated as H1(2), H2(2), and H3(2) correspond to a 20 kHz PWM commutation frequency.

Figure 14B:
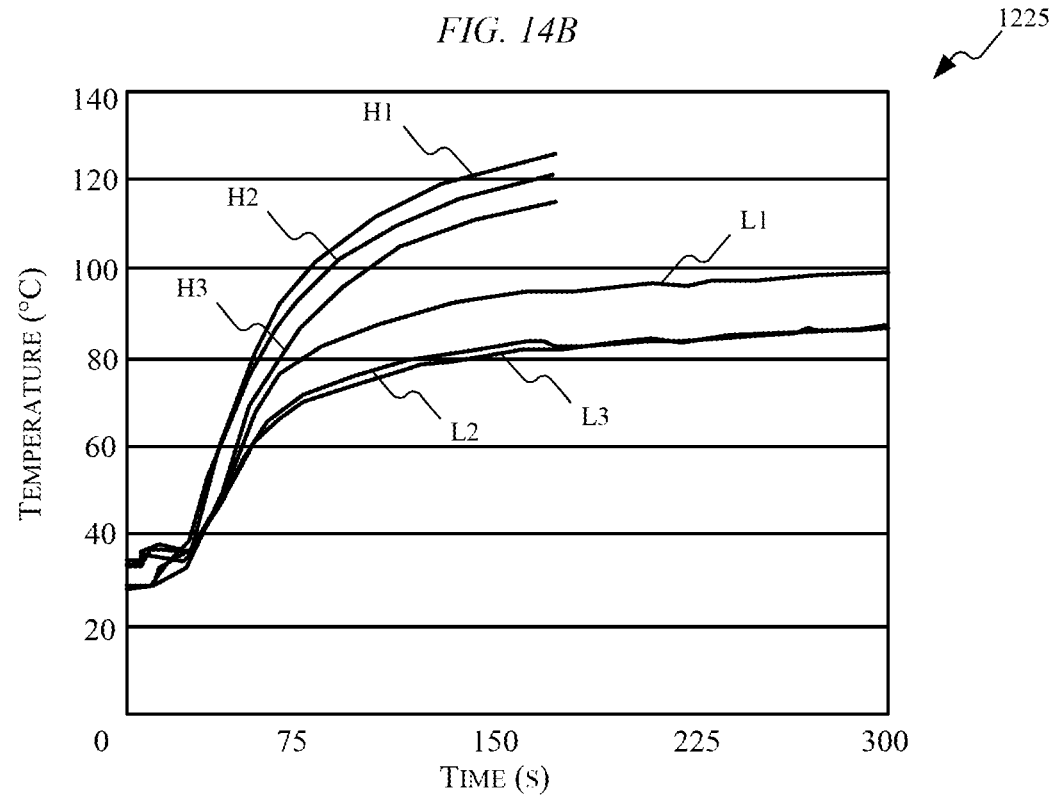
FIG. 14B is a diagram of heat generated by non-switching FETs during centerline commutation and in the second low-speed operational mode.

FIG. 14B is a diagram 1225 of the non-switching FETs during centerline commutation at the second low operational speed and the corresponding rise in temperature of the non-switching FETs. The switches designated in FIG. 14B as L1, L2, and L3 correspond to the non-switching FETs during high-side centerline commutation, and the switches designated as H1, H2, and H3 correspond to the non-switching FETs during low-side centerline commutation.

Figure 15A:
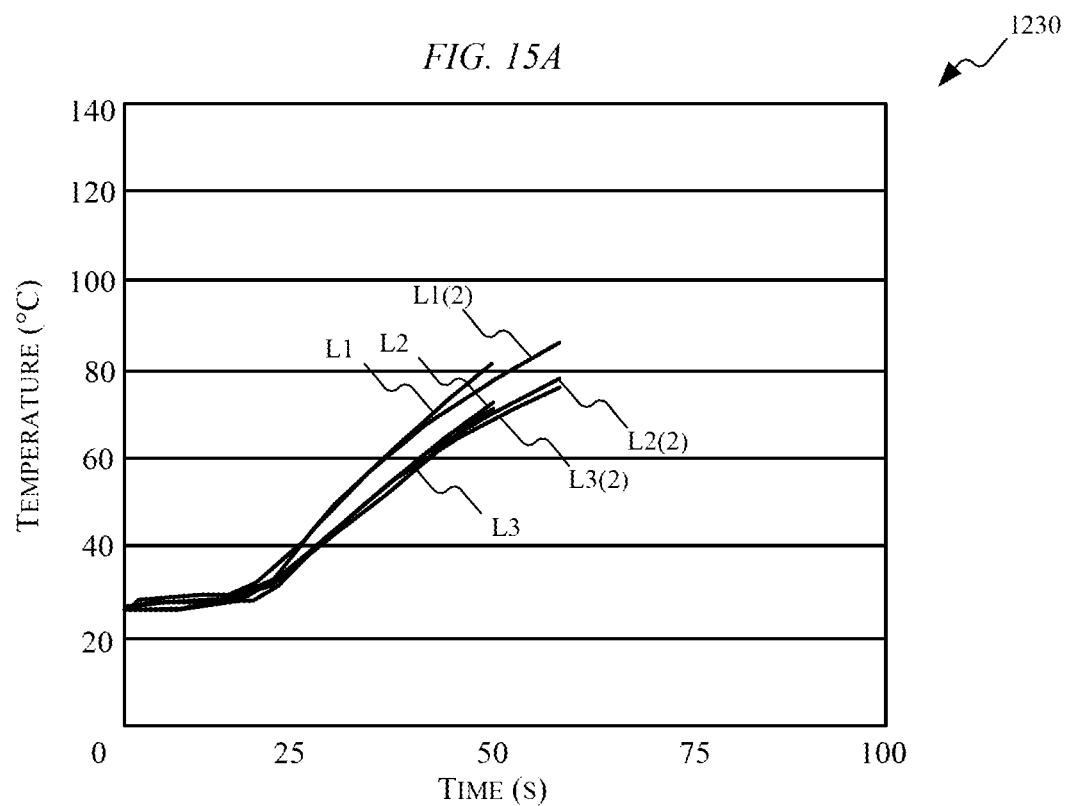
FIG. 15A illustrates is a diagram of heat generated by switching FETs during PWM commutation and in the first low-speed operational mode.

FIG. 15A is a diagram 1230 of the switching FETs during low-side PWM commutation at the first low operational speed and the corresponding rise in temperature of the switching FETs L1, L2, and L3. The switches designated in FIG. 15A as L1, L2, and L3 correspond to a 5 kHz PWM commutation frequency, and the switches designated as L1(2), L2(2), and L3(2) correspond to a 20 kHz PWM commutation frequency.

Figure 15B:
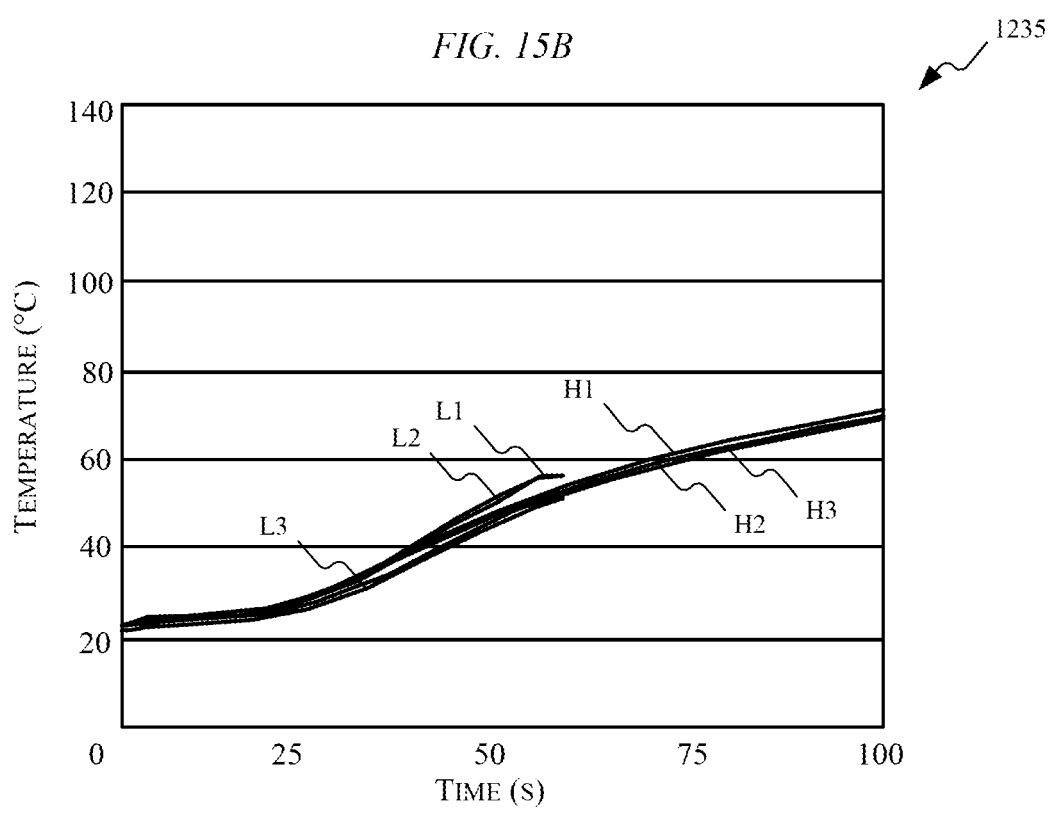
FIG. 15B illustrates is a diagram of heat generated by switching FETs during centerline commutation and in the first low-speed operational mode.

FIG. 15B is a diagram 1235 of the switching FETs during centerline commutation at the first low operational speed and the corresponding rise in temperature of the switching FETs. The switches designated in FIG. 15B as L1, L2, and L3 correspond to the switching FETs during low-side centerline commutation, and the switches designated as H1, H2, and H3 correspond to the switching FETs during high-side centerline commutation.

Figure 16A:
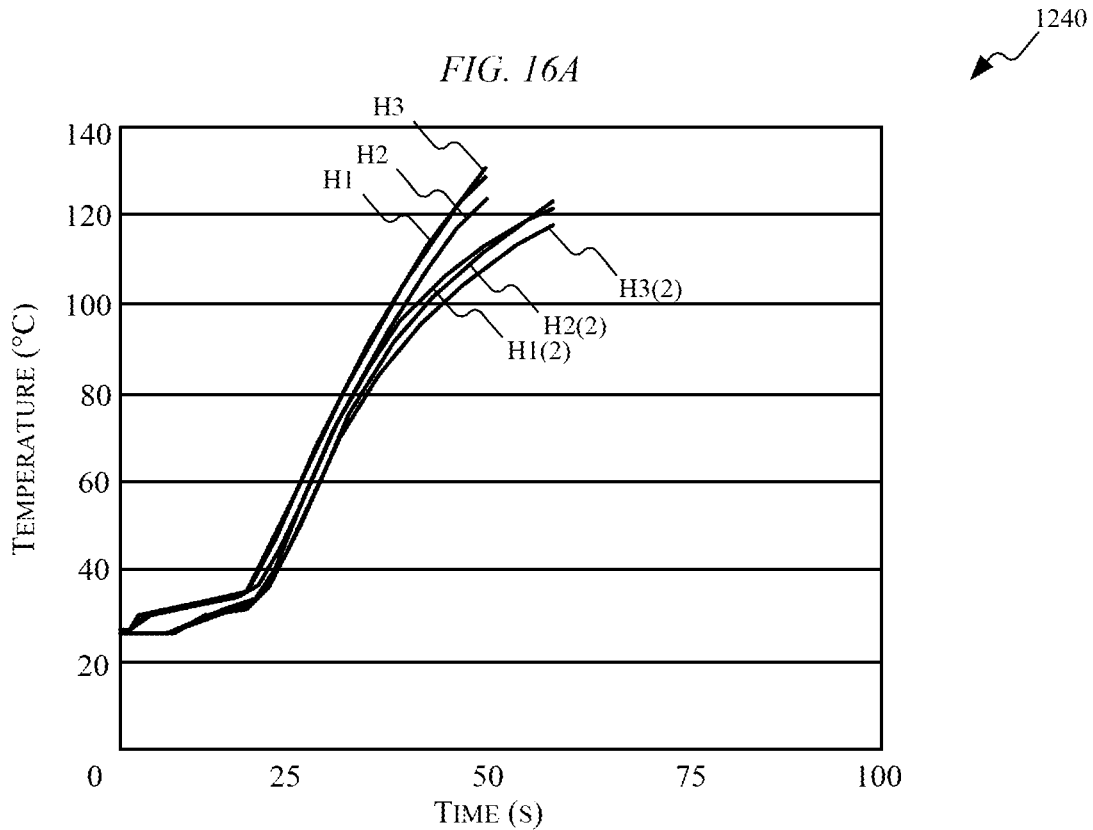
FIG. 16A is a diagram of heat generated by non-switching FETs during PWM commutation and in the first low-speed operational mode.

FIG. 16A is a diagram 1240 of the non-switching FETs during low-side PWM commutation at the first low operational speed and the corresponding rise in temperature of the non-switching FETs H1, H2, and H3. The switches designated in FIG. 16A as H1, H2, and H3 correspond to a 5 kHz PWM commutation frequency, and the switches designated as H1(2), H2(2), and H3(2) correspond to a 20 kHz PWM commutation frequency.

Figure 16B:
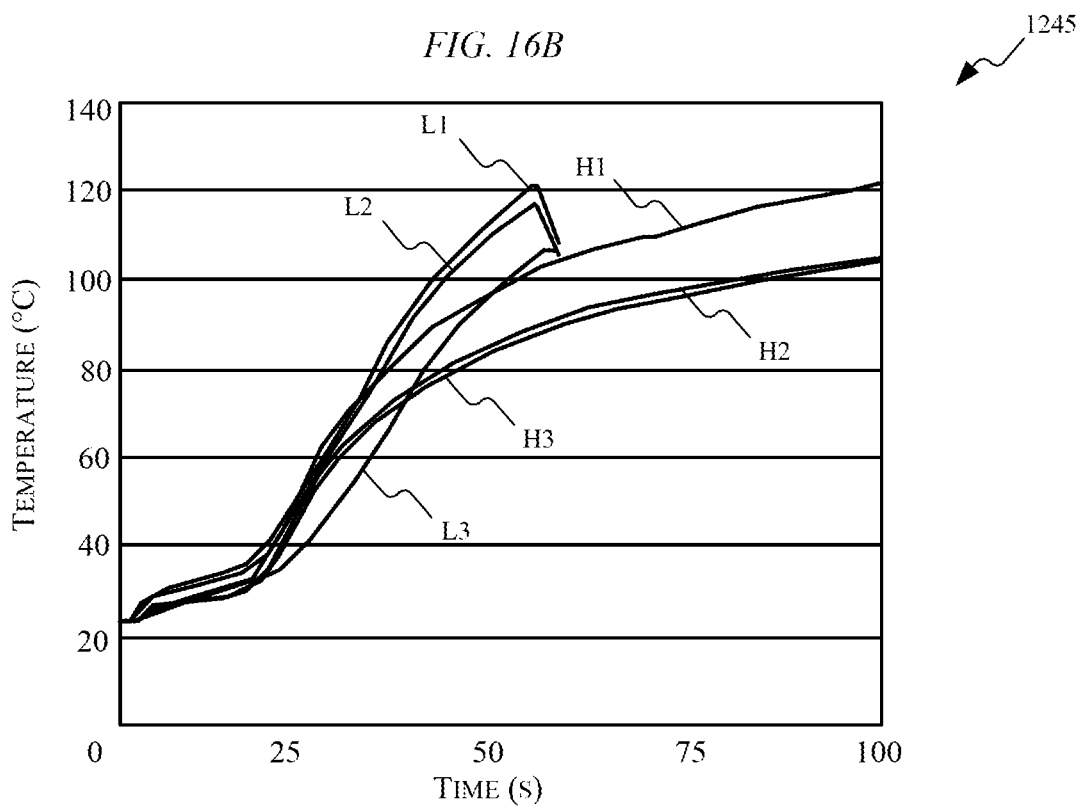
FIG. 16B is a diagram of heat generated by non-switching FETs during centerline commutation and in the first low-speed operational mode.

FIG. 16B is a diagram 1245 the non-switching FETs during centerline commutation at the first low operational speed and the corresponding rise in temperature of the switching FETs. The switches designated in FIG. 16B as L1, L2, and L3 correspond to the non-switching FETs during high-side centerline commutation, and the switches designated as H1, H2, and H3 correspond to the non-switching FETs during low-side centerline commutation.

Figure 17:
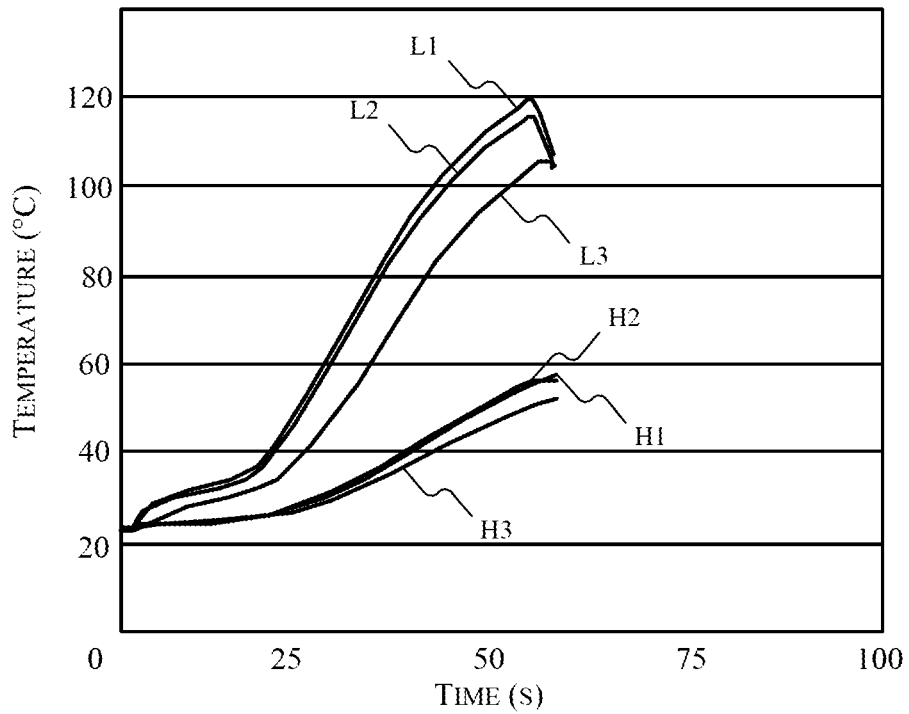
FIG. 17 is a diagram of heat generated by FETs during centerline commutation and in the first low-speed operational mode.

FIG. 17 is a diagram the switching FETs and non-switching FETs during centerline commutation at the first low operational speed and the corresponding rise in temperature of the FETs. The switches designated in FIG. 17A as L1, L2, and L3 correspond to the switching FETs during low-side centerline commutation, and the switches designated as H1, H2, and H3 correspond to the non-switching FETs during low-side centerline commutation.

Figure 18A:
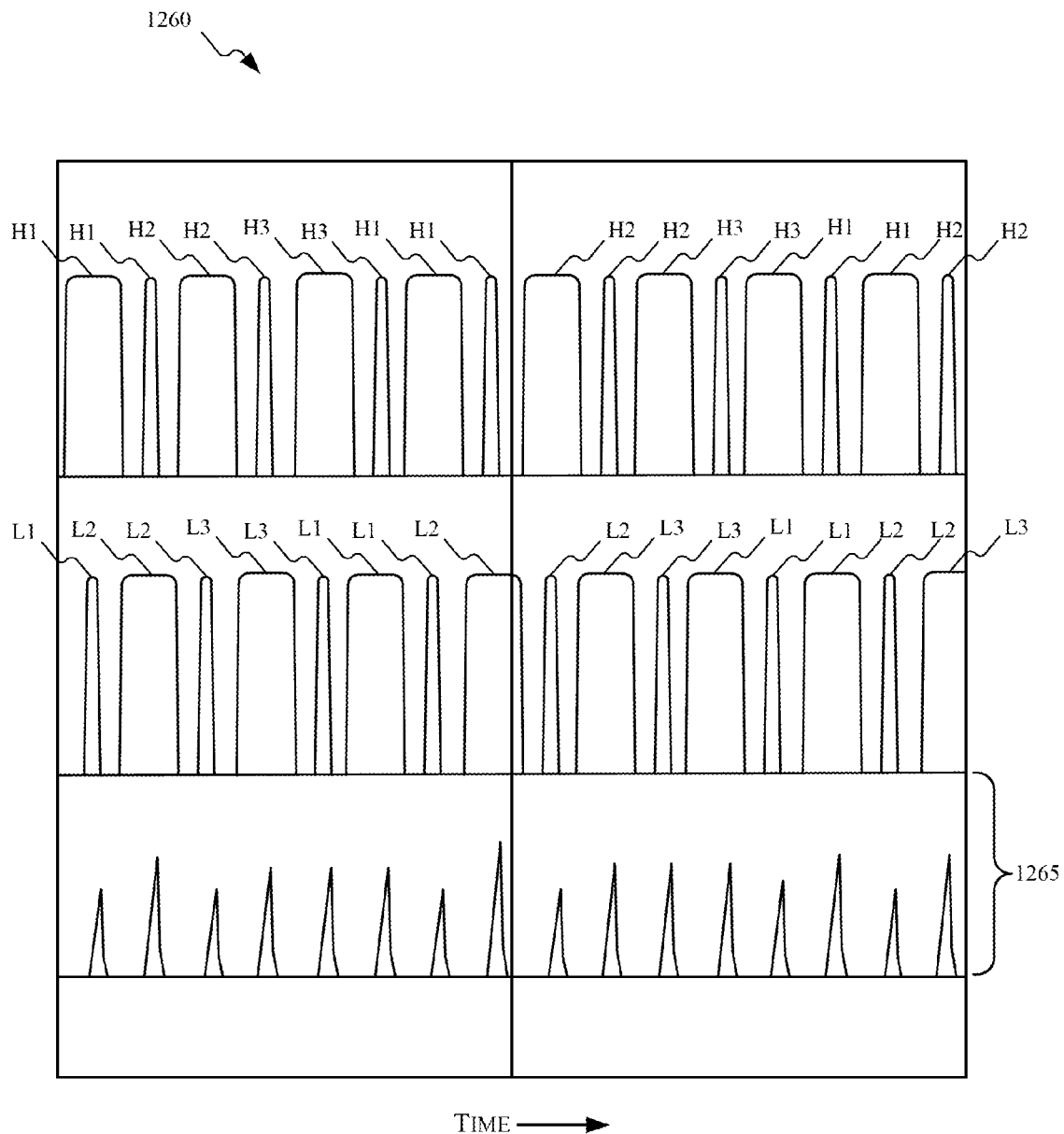
FIG. 18A is a diagram of high-side FET activation and low-side FET activation for combined high-side centerline commutation and low-side centerline commutation.

FIG. 18A is a diagram 1260 of a combination of high-side centerline commutation and low-side centerline commutation. Each of the FETs H1, H2, H3, L1, L2, and L3 is switching once per 6 commutation phases, which results in approximately or substantially equal sharing of freewheeling losses. The current drawn from the battery pack 500 is correspondingly illustrated at 1265.

Figure 18B:
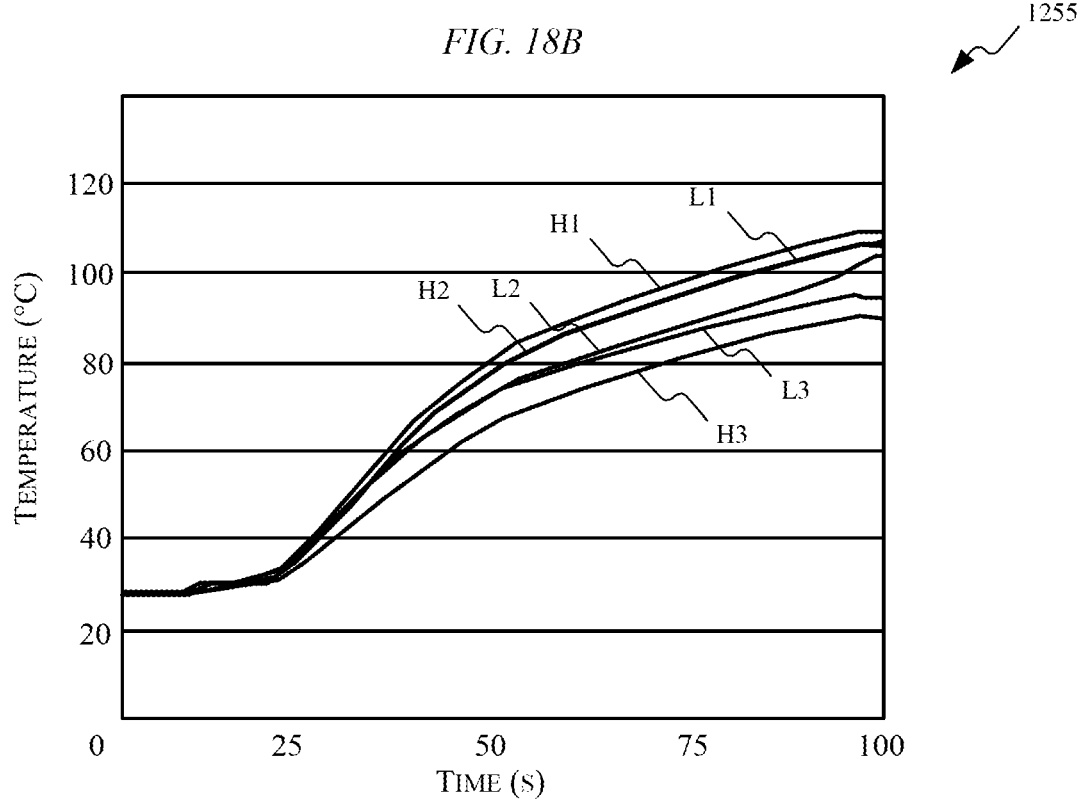
FIG. 18B is a diagram of heat generated during combined high-side and low-side centerline commutation and in the first low-speed operational mode.

FIG. 18B is a diagram the switching FETs and non-switching FETs during combined high- and low-side centerline commutation (see FIG. 18A) at the first low operational speed and the corresponding rise in temperature of the FETs. Each of the switches designated in FIG. 18B is used as both a switching FET and a non-switching FET (e.g., alternately).

In a manner similar to that described above with respect to the speed of the power tool motor falling below a second threshold value, the power tool motor transitions from centerline commutation to PWM commutation when a stall condition is detected or anticipated (e.g., when no new rotor position signal is received). If the power tool motor did not switch back from centerline commutation to PWM commutation, it is possible that the motor could get stuck in centerline commutation and waiting for a Hall sensor transition signal that never arrives.

Figure 19:
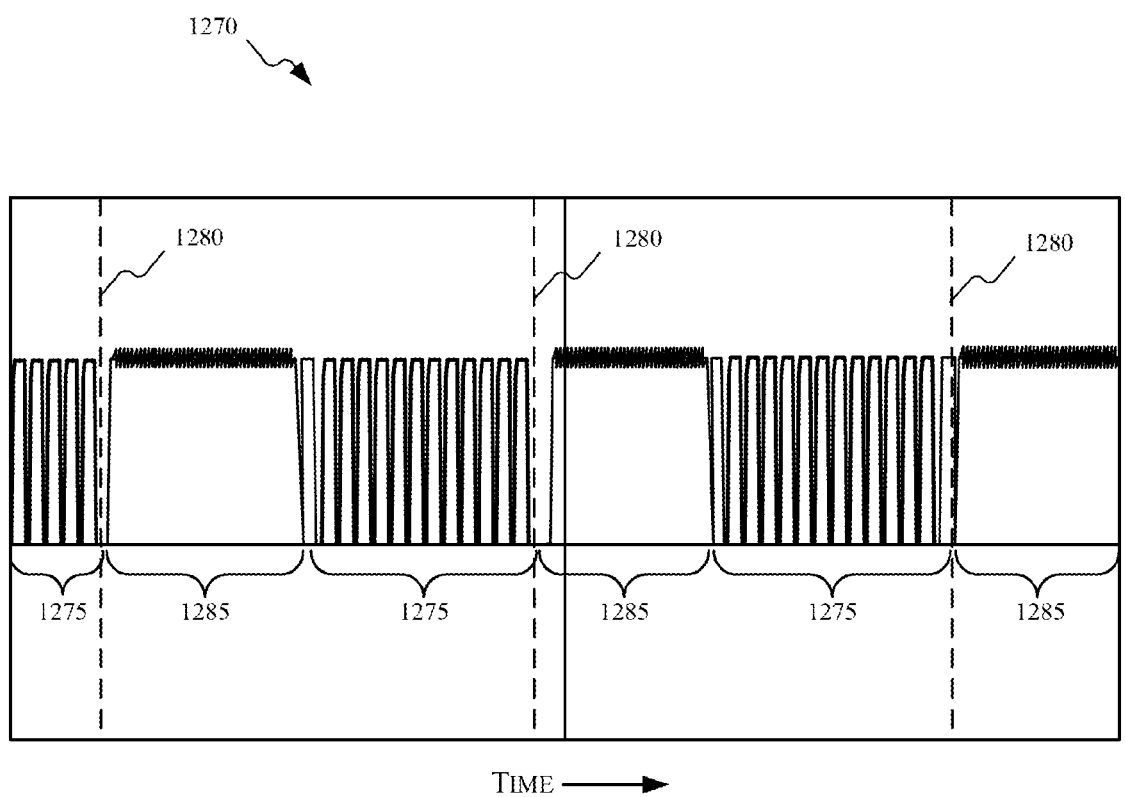
FIG. 19 is a diagram illustrating transitions between PWM commutation and centerline commutation during stall conditions.

For example, as shown in diagram 1270 of FIG. 19, a power tool was operated using centerline commutation 1275 at a low duty cycle. The power tool then experiences a stall condition 1280 (i.e., stopped rotating). When the stall condition 1280 occurs, the power tool motor is switched from centerline commutation 1275 to PWM commutation 1285. The stall condition is detected using, for example, an absence of Hall sensor transitions for a predetermined period of time. In some embodiments, if the Hall sensor transition is not received within, for example, one-second, a stall condition is identified. In other embodiments, a longer duration is used (e.g., up to five seconds) or another suitable period of time for which the motor is able to be in a stall condition without causing damage to the motor. When the stall condition is cleared (i.e., is able to begin rotating again), the power tool motor is able to correctly transition from PWM commutation to centerline commutation after the first threshold speed value is reached by the motor.

Additionally, for power tools such as impact drivers or impact wrenches, a stall condition can be caused by a motor not generating sufficient motor torque to overcome a spring biasing force of an impact mechanism. Such a stall condition results from the motor not receiving enough power to generate the sufficient motor torque, and can be caused by, for example, a low battery charge. Alternatively, the motor may not receive enough power when the motor is being operated at a low speed during centerline commutation. When a power tool such as an impact driver or impact wrench is implemented in combination with a BLDC motor (which has high- and low-driving torque peaks and valleys as the motor rotates), there are locations during a rotational cycle of the motor (and corresponding output torque profiles) at which the impact mechanism is locked in a driving mode and cannot be tripped because the motor does not produce enough motor torque. If this occurs, instead of the impact mechanism tripping, the motor would stall. In some instances, the motor may stall at a full applied power condition (i.e., 100% PWM). Such a problem is exacerbated in power tools including or capable of operating in a low-speed or partial-power mode. In such instances, less power is being provided to the motor, and the frequency with which the motor does not produce sufficient motor torque to overcome the bias of the impact mechanism increases.

The current through the impact driver's motor or the impact wrench's motor has a linear relationship with the generated torque. However, momentum also creates torque. To overcome the stall conditions described above, a combination of motor current and momentum is used to generate enough torque to overcome the spring force of the impact mechanism. When power is completely removed from a motor, the motor creeps back or reverses based on elasticity within gear mechanisms (i.e., recoil). After the motor creeps or rotates backwards, full motor current is applied to overcome the stall condition. The duration of the current pulse is, for example, between approximately one-millisecond and approximately five-milliseconds. In other embodiments, a longer duration current pulse is used (e.g., between one-millisecond and fifty-milliseconds). In some embodiments, the threshold values for transitioning between PWM commutation and centerline commutation can be modified (e.g., increased) to reduce the likelihood of the motor not receiving enough power to overcome the spring biasing force when operating in centerline commutation. The stall condition is detected using, for example, an absence of Hall sensor transitions for a predetermined period of time or percentage of a motor or phase cycle (e.g., $1/12^{th}$ of a rotation), and can occur above a low-voltage cutoff of the battery pack. If the power tool is operating in centerline commutation mode when the stall condition occurs, the operation of the motor can be transitioned back to PWM commutation in order to apply the current pulse.

Thus, the invention provides, among other things, control systems and methods for a power tool (e.g., a hand-held power tool) that includes a brushless motor (e.g., a brushless direct current ["BLDC"] motor). Various features and advantages of the invention are set forth in the following claims.

What is claimed is:

1. A power tool comprising:
a brushless direct current ("BLDC") motor; and
a controller configured to
drive the motor using pulse-width modulation ("PWM") commutation,
determine a speed of the motor,
compare the speed of the motor to a first threshold value,
drive the motor using centerline commutation when the speed of the motor is greater than the first threshold value,
compare the speed of the motor to a second threshold value when driving the motor using centerline commutation, and
drive the motor in using PWM commutation when the speed of the motor is below the second threshold value.

2. The power tool of claim 1, wherein the first threshold value is greater than the second threshold value.

3. The power tool of claim 1, wherein the controller is further configured to identify a motor stall condition.

4. The power tool of claim 3, wherein the controller is further configured to transition from driving the motor using centerline commutation to driving the motor using PWM commutation when the controller identifies the motor stall condition.

5. The power tool of claim 4, wherein the controller is further configured to remove power from the motor when the controller identifies the stall condition, and then apply a current pulse to the motor to overcome the stall condition.

6. The power tool of claim 1, further comprising a switching assembly for driving the motor.

7. The power tool of claim 6, wherein the switching assembly includes at least a first switch having a conducting state and a non-conducting state, and a second switch having a conducting state and a non-conducting state.

8. The power tool of claim 7, wherein a driving current is applied to the motor when the first switch and the second switch are each in the conducting state.

9. The power tool of claim 8, wherein the first switch is operable to control a speed of the motor when driving the motor using centerline commutation.

10. The power tool of claim 9, wherein the first switch and the second switch are each operable to control the speed of the motor when driving the motor using centerline commutation.

11. The power tool of claim 10, wherein the first switch and second switch are alternately operable to control the speed of the motor when driving the motor using centerline commutation.

12. A method of controlling commutation of a motor in a power tool, the method comprising:
controlling a plurality of switches to drive the motor using a first commutation scheme;
determining a speed of the motor;
comparing the speed of the motor to a first threshold value when driving the motor using the first commutation scheme;

controlling the plurality of switches to drive the motor using a second commutation scheme when the speed of the motor is greater than the first threshold value;

comparing the speed of the motor to a second threshold value when driving the motor using the second commutation scheme; and controlling the plurality of switches to drive the motor in using the first commutation scheme when the speed of the motor is below the second threshold value.

13. The method of claim 12, wherein the first threshold value is greater than the second threshold value.

14. The method of claim 12, wherein the first commutation scheme is a pulse-width modulation ("PWM") commutation scheme and the second commutation scheme is a centerline commutation scheme.

15. The method of claim 12, wherein the plurality of switches includes a plurality of high-side motor commutation switches and a plurality of low-side motor commutation switches.

16. The method of claim 15, wherein the plurality of low-side motor commutation switches are operable to control the speed of the motor when controlling the plurality of switches to drive the motor using the second commutation scheme.

17. The method of claim 16, wherein the plurality of high-side commutation switches and the plurality of low-side motor commutation switches are alternately operable to control the speed of the motor when controlling the plurality of switches to drive the motor using the second commutation scheme.

18. A power tool comprising:
an electronically commutated motor;
a switching assembly including a plurality of switches; and
a controller configured to
control the plurality of switches to drive the motor using a first commutation scheme,
determine a speed of the motor,
compare the speed of the motor to a first threshold value,
control the plurality of switches to drive the motor using a second commutation scheme when the speed of the motor is greater than the first threshold value,
compare the speed of the motor to a second threshold value when driving the motor using the second commutation scheme, and
control the plurality of switches to drive the motor in using the first commutation scheme when the speed of the motor is below the second threshold value, wherein the first threshold value is greater than the second threshold value.

19. The power tool of claim 18, wherein the first commutation scheme is a pulse-width modulated ("PWM") commutation scheme and the second commutation scheme is a centerline commutation scheme.

20. The power tool of claim 18, wherein the second commutation scheme includes fewer commutation switching events in a commutation cycle than the first commutation scheme.

21. The power tool of claim 18, wherein the controller is further configured to identify a motor stall condition.

22. The power tool of claim 21, wherein the controller is further configured to transition from driving the motor using the second commutation scheme to driving the motor using the first commutation scheme when the controller identifies the motor stall condition.

23. The power tool of claim 18, wherein the switching assembly includes at least a first switch having a conducting state and a non-conducting state, and a second switch having a conducting state and a non-conducting state,
wherein a driving current is applied to the motor when the first switch and the second switch are each in the conducting state, and
wherein the first switch is operable to control a speed of the motor when driving the motor using the second commutation scheme.

24. The power tool of claim 23, wherein the first switch and second switch are alternately operable to control the speed of the motor when driving the motor using the second commutation scheme.

* * * * *